(12) United States Patent
Yabuta et al.

(10) Patent No.: US 7,486,350 B2
(45) Date of Patent: Feb. 3, 2009

(54) DISPLAY DEVICE, VIEWING ANGLE CONTROL DEVICE, ELECTRONIC DISPLAY DEVICE, AND MULTIPLE IMAGE DISPLAY DEVICE

(75) Inventors: Koji Yabuta, Kashiba (JP); Hiroshi Fukushima, Yamatokoriyama (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 343 days.

(21) Appl. No.: 11/315,128

(22) Filed: Dec. 23, 2005

(65) Prior Publication Data

US 2007/0146578 A1    Jun. 28, 2007

(51) Int. Cl.
G02F 1/1335    (2006.01)
(52) U.S. Cl. .............................. 349/96; 349/41; 349/83; 349/97; 349/99; 349/104; 349/108; 349/201; 349/202
(58) Field of Classification Search .................... 349/18, 349/41, 42, 44, 83, 96, 97, 99, 100, 104, 349/105, 123, 124, 108, 129, 201, 202
See application file for complete search history.

(56) References Cited

U.S. PATENT DOCUMENTS

| 6,437,915 B2 * | 8/2002 | Moseley et al. ............. 359/465 |
| 6,445,434 B2 | 9/2002 | Takato et al. ................ 349/123 |
| 7,106,389 B2 * | 9/2006 | Katoh et al. .................... 349/8 |
| 2002/0001045 A1 * | 1/2002 | Ranganath et al. ............. 349/11 |
| 2002/0001128 A1 * | 1/2002 | Moseley et al. ............. 359/465 |
| 2004/0100598 A1 * | 5/2004 | Adachi et al. ................ 349/113 |
| 2005/0001787 A1 * | 1/2005 | Montgomery et al. .......... 345/6 |
| 2007/0146578 A1 * | 6/2007 | Yabuta et al. ................ 349/96 |

FOREIGN PATENT DOCUMENTS

| JP | 01-277215 | 11/1989 | ............. 349/123 X |
| JP | 05-108023 | 4/1993 | ............. 349/123 X |
| JP | 9-105958 A | 4/1997 | ................ 349/123 |
| JP | 11-174489 | 7/1999 | ............. 349/123 X |

(Continued)

OTHER PUBLICATIONS

Nikkei Business Daily article and English translation thereof entitled "An LCD Realizes Different Images to Different Angles", Jul. 15, 2005.

(Continued)

Primary Examiner—Brian M Healy
(74) Attorney, Agent, or Firm—Nixon & Vanderhye P.C.

(57) ABSTRACT

A display device includes: a main LCD; a SW LCD, disposed on an optical path of light transmitting through the main LCD, for electrically switching a visible image between a single image display mode and a multiple image display mode; a first polarizer; and a second polarizer. The major axis direction of liquid crystal molecules in the liquid crystal layer of the SW LCD is always substantially parallel to the polarization direction of light after transmission through the first polarizer when projected from the normal to the substrates. At least some of the liquid crystal molecules in the liquid crystal layer are controlled in terms of alignment direction so that the major axis direction of the liquid crystal molecules is substantially parallel to the substrates in the single image display mode and tilted from the substrates in the multiple image display mode.

23 Claims, 14 Drawing Sheets

FOREIGN PATENT DOCUMENTS

| JP | 2001-264768 | 9/2001 | ................. 349/123 |
| JP | 2003-222872 A | 8/2003 | ................. 349/123 |
| JP | 2003-233074 A | 8/2003 | ................. 349/123 |
| JP | 2004-38035 A | 2/2004 | ................. 349/123 |
| JP | 2004-062094 A | 2/2004 | ................. 349/123 |
| JP | 2005-292586 | 10/2005 | |
| JP | 2006-064882 | 3/2006 | ............. 349/123 X |

OTHER PUBLICATIONS

Yomiuri Newspaper article and English translation thereof entitled "Different Images Viewed from Different Positions", Jul. 15, 2005.

Asahi Newspaper article and English translation thereof entitled "Sharp's New Liquid Crystal Panel", Jul. 15, 2005.

Mainichi Newspaper article and English translation thereof entitled "Different Faces to Different Directions", Jul. 15, 2005.

Sankei Newspaper article and English translation thereof entitled "Enjoy soccer Game from the Right, Drama from the Left", Jul. 15, 2005, p. 3 and "Sharp Targets ¥1 Trillion Total Sales with LCDs", p. 10.

Denpa Newspaper article and English translation thereof entitled "Sharp Realizes the World's First LCD for Simultaneously Display Different Information to the Right and the Left by Applying 3D LCD Technologies", Jul. 15, 2005, p. 1 and Sharp's LCD Development, p. 2.

Nikkei Business Daily (Tokyo area) article and English translation thereof entitled"An LCD Realizes Different Images to Different Angles", Jul. 15, 2005, p. 1 and "Today's Word—Viewing Angle", p. 3.

Asahi Newspaper article and English translation thereof entitled Sharp's New Liquid Crystal Panel, Jul. 15, 2005.

Yomiuri Newspaper article and English translation thereof entitled "Different Images View from Different Positions", Jul. 15, 2005.

Mainichi Newspaper Article and English translation thereof entitled "Different Images View from Different Angles", Jul. 15, 2005.

Tokyo Newspaper article and English translation thereof entitled "Baseball Game from the Right, Cartoon Show from the Left", Jul. 15, 2005.

Nikkei Sangyo newspaper article and English translation thereof entitled "No Fears to be Snooped", Jul. 15, 2005.

Japan Industrial Journal article and English translation thereof entitled "Two Images Viewed from Different Directions", Jul. 15, 2005, p. 1 and "Sharp Realizes an LCD Serving Two Ways", p. 10.

Business I article and English translation thereof entitled "TV from the Right, Internet from the Left", Jul. 15, 2005, p. 1; "Powerful in a Car or Narrow Space"; and LCD for Preventing Snooping.

Sankei newspaper article and English translation thereof entitled "No Channel Fighting Any More", Jul. 15, 2005.

The Chemical Daily article and English translation thereof entitled "Sharp Developed Viewing Angle Controlling LCD", Jul. 15, 2005.

Nikkei Marketing Journal article and English translation thereof entitled "Nikkei Consumption Mining: Inauguration Symposium", Jul. 15, 2005.

Nikkei Business Daily article and English translation thereof entitled "An LCD Realizes Different Images to Different Angles", Jul. 15, 2005.

Yomiuri Newspaper article and English translation thereof entitled "Different Images Viewed from Different Positions", Jul. 15, 2005.

Asahi Newspaper article and English translation thereof entitled "Sharp's New Liquid Crystal Panel", Jul. 15, 2005.

Mainichi Newspaper article and English translation thereof entitled "Different Faces to Different Directions", Jul. 15, 2005.

Sankei Newspaper article and English translation thereof entitled "Enjoy soccer Game from the Right, Drama from the Left", Jul. 15, 2005, p. 3 and "Sharp Targets ¥1 Trillion Total Sales with LCDs", p. 10.

Denpa Newspaper article and English translation thereof entitled "Sharp Realizes the World's First LCD for Simultaneously Display Different Information to the Right and the Left by Applying 3D LCD Technologies", Jul. 15, 2005, p. 1 and Sharp's LCD Development, p. 2.

Nikkei Business Daily (Tokyo area) article and English translation thereof entitled"An LCD Realizes Different Images to Different Angles", Jul. 15, 2005, p. 1 and "Today's Word—Viewing Angle", p. 3.

Asahi Newspaper article and English translation thereof entitled Sharp's New Liquid Crystal Panel, Jul. 15, 2005.

Yomiuri Newspaper article and English translation thereof entitled "Different Images View from Different Positions", Jul. 15, 2005.

Mainichi Newspaper Article and English translation thereof entitled "Different Images View from Different Angles", Jul. 15, 2005.

Tokyo Newspaper article and English translation thereof entitled "Baseball Game from the Right, Cartoon Show from the Left", Jul. 15, 2005.

Nikkei Sangyo newspaper article and English translation thereof entitled "No Fears to be Snooped", Jul. 15, 2005.

Japan Industrial Journal article and English translation thereof entitled "Two Images Viewed from Different Directions", Jul. 15, 2005, p. 1 and "Sharp Realizes an LCD Serving Two Ways", p. 10.

Business I article and English translation thereof entitled "TV from the Right, Internet from the Left", Jul. 15, 2005, p. 1; "Powerful in a Car or Narrow Space"; and LCD for Preventing Snooping.

Sankei newspaper article and English translation thereof entitled "No Channel Fighting Any More", Jul. 15, 2005.

The Chemical Daily article and English translation thereof entitled "Sharp Developed Viewing Angle Controlling LCD", Jul. 15, 2005.

Nikkei Marketing Journal article and English translation thereof entitled "Nikkei Consumption Mining: Inauguration Symposium", Jul. 15, 2005.

Financial Times article entitled "Sharp Finds New Angle on LCDs", Jul. 15, 2005.

* cited by examiner

→ RUBBING DIRECTION FOR ALIGNING FILM 24
--→ RUBBING DIRECTION FOR ALIGNING FILM 25
↔ POLARIZED-LIGHT-TRANSMISSION AXIS OF SECOND POLAROZER 11
↔-- POLARIZED-LIGHT-TRANSMISSION AXIS OF FIRST POLAROZER 13

DISPLAY DEVICE, VIEWING ANGLE CONTROL DEVICE, ELECTRONIC DISPLAY DEVICE, AND MULTIPLE IMAGE DISPLAY DEVICE

FIELD OF THE INVENTION

The present invention relates in general to display devices, viewing angle control devices, electronic display devices, and multiple image display devices, and in particular to those capable of switching to a mode in which the user can view different images depending on viewing direction.

BACKGROUND OF THE INVENTION

Recent developments of lightweight electronic devices have enabled users to take electronic devices with a display, such as mobile phones and personal computers, out of home and use in public places. A problem arises here that people near the user can view confidential documents and information meant for private browsing.

To address the problem, a display device is being proposed which normally operates in wide viewing angle display mode and when used in public places, can be switched to narrow viewing angle display mode. In the narrow viewing angle mode, the user, who is right in front of the display device, can view a normal display, but other people who are in oblique directions can see only a solid color or another image. Also, the capability to switch to the wide viewing angle display mode enables many people to view a captured image together or otherwise enables the user to use the device in situations where the wide viewing angle is needed.

A component realizing such a display is disclosed in Japanese Unexamined Patent Publication 9-105958/1997 (Tokukaihei 9-105958; published Apr. 22, 1997), for example. The viewing angle varying element disclosed there includes a liquid crystal layer between a pair of substrates. The element achieves the narrow viewing angle mode by aligning liquid crystal molecules vertical to the substrates and achieves the wide viewing angle by aligning them parallel to the substrates. Another component is disclosed in Japanese Unexamined Patent Publication 2004-62094 (Tokukai 2004-62094; published Feb. 26, 2004). The disclosed viewing angle varying means varies alignment of liquid crystal between two glass plates to change the viewing angle of information display means.

There are also display devices divided into some sections which differ, for example, in the direction of alignment of liquid crystal. This particular structure enables a narrow viewing angle mode in which observers who are not in front of the display device will see a different image from the one perceived by a user in front of the display device. For example, Japanese Unexamined Patent Publication 2001-264768 (Tokukai 2001-264768; published Sep. 26, 2001) discloses a liquid crystal display device containing aligning films which sandwich a liquid crystal layer are divided into multiple regions, the alignment direction differing between adjacent regions. In addition, Japanese Unexamined Patent Publication 2004-38035 (Tokukai 2004-38035; published Feb. 5, 2004) discloses a liquid crystal display device containing first liquid crystal cells and second liquid crystal cells having different viewing angle directions, the first and second liquid crystal cells being arranged alternately.

The Tokukaihei 9-105958 structure realizes the narrow viewing angle mode by vertically aligning liquid crystal molecules to change the refractive index. It is however difficult to retain image display quality with control of viewing angle through the refractive index.

Tokukai 2004-62094 does describe the control of the viewing angle of the display device through changes in liquid crystal alignment. The document however does not give any description on how to change the liquid crystal alignment, failing to realize the viewing angle control.

The Tokukai 2001-264768 structure is described to show a fixed pattern, no matter what the display signal, to observers who are not in front of the display device. Structurally, however, the display image cannot be hidden well from those observers who are not in front of the display device because the pattern appears reversed in gray levels when viewed from the right and from the left. Specifically, if the structure contains many regions which are non-transmissive when viewed from the right, many regions are transmissive when viewed from the left. So, the screen can be hidden from both the left and right sides only by superimposing an image, like hound's tooth checks, which consists of the same number of transmissive and non-transmissive regions.

The Tokukai 2004-38035 structure contains many small liquid crystal cells arranged on a plate. The liquid crystal display device involves a complex structure and difficult to manufacture.

As described in the foregoing, no known display device has high display quality, is capable of switching to a mode in which the display image is appropriately hidden when viewed from an oblique direction, and has a simple structure.

SUMMARY OF THE INVENTION

The present invention, conceived to address these problems, has an objective to realize a display device, a viewing angle control device, an electronic display device, and a multiple image display device with a simplified structure which however does not allow display quality degradation and is capable of hiding the display image from observers in particular directions through mode switching.

To achieve the objective, the display device in accordance with the present invention is characterized as follows. The device includes: a display switching section for electrically switching a visible image between a single image display mode and a multiple image display mode; first polarizer for causing linearly polarized light in a predetermined direction to enter the display switching section; and second polarizer for filtering out linearly polarized light in a predetermined direction from light leaving the display switching section, wherein: the display switching section is a liquid crystal layer disposed between a pair of substrates; a major axis direction of liquid crystal molecules in the liquid crystal layer when the liquid crystal molecules are projected from the normal to the substrates is always substantially parallel or substantially vertical to a linear polarization direction of light incident to the liquid crystal molecules; the second polarizer filters out linearly polarized light leaving the liquid crystal molecules; and at least some of the liquid crystal molecules in the liquid crystal layer are aligned so that the major axis direction of the liquid crystal molecules is substantially parallel or substantially vertical to the substrates in the single image display mode and tilted from the substrates in the multiple image display mode.

Here, "tilting" refers to "neither parallel nor vertical to a certain direction or a certain plane."

For example, the major axis direction of the liquid crystal molecules in the liquid crystal element is in the plane defined by the direction of the transmission axis or the absorption axis of the first polarizer and the traveling direction of light. The liquid crystal molecules can assume a state where the major axis direction is substantially vertical or substantially parallel to the traveling direction of light and a state where the major axis direction is tilted from the traveling direction of light.

In other words, the major axis direction of the liquid crystal molecules in the liquid crystal layer is substantially parallel to the substrate and either substantially parallel or substantially vertical to the polarized-light-transmission axis of the first polarizer in the single image display mode. In the multiple image display mode, the major axis direction is tilted vertical to the substrate from the state of the single image display mode. Alternatively, the major axis direction of the liquid crystal molecules in the liquid crystal layer is substantially vertical to the substrate in the single image display mode. In the multiple image display mode, the major axis direction is tilted in a plane either substantially parallel or substantially vertical to the polarized-light-transmission axis of the first polarizer and vertical to the substrate from the state of the single image display mode.

Hence, the first polarizer polarizes the light incident to the display switching section linearly in a predetermined direction. In addition, the liquid crystal layer of the display switching section are aligned so that the major axis direction when the liquid crystal molecules are projected from the normal to the substrate always substantially parallel or substantially vertical to the polarization direction of light after transmission through the first polarizer.

When the polarization direction of the linearly polarized light incident to the liquid crystal layer is parallel or vertical to the major axis direction when the liquid crystal molecules is projected from a certain direction, no birefringence occurs in the liquid crystal layer if it is viewed from this direction. Therefore, no matter which mode is selected, no birefringence occurs in the liquid crystal layer if it is viewed from a direction parallel to the plane defined by points on the liquid crystal molecules when their alignment is changed (hereinafter, "the front direction"). Therefore, the image on the image display section is visible if the second polarizer filters out linearly polarized light in the same direction as the first polarizer, for example, by matching the polarized-light-transmission axis of the first polarizer with that of the second polarizer or disposing a member which rotates the polarization direction of the linearly polarized light leaving the first polarizer so that the light matches with the transmission axis of the second polarizer and causes the light to enter the second polarizer.

In contrast, if viewed from a direction other than the front direction (hereinafter, an "oblique direction"), different images are visible in the single image display mode and in the multiple image display mode.

In the single image display mode, the major axis direction of the liquid crystal molecules is substantially parallel or substantially vertical to the substrates. Therefore, the major axis direction of the liquid crystal molecules when projected from an oblique direction is the same as that when viewed from the front. Therefore, the liquid crystal molecules cause no birefringence when viewed from an oblique direction. Incident light can pass through the liquid crystal layer and the second polarizer; the image on the image display section is visible.

In contrast, in the multiple image display mode, the major axis direction of the liquid crystal molecules is tilted from the substrates. Therefore, the major axis direction of the liquid crystal molecules when projected from the oblique direction has a cross angle to the polarization direction of the incident light. Therefore, the liquid crystal molecules cause birefringence when viewed from an oblique direction. The polarization direction of light after transmission through the liquid crystal layer changes and can no longer pass through the second polarizer. The image on the image display section is not visible.

Therefore, in the single image display mode, the image displayed by the image display section is visible from any direction. In the multiple image display mode, the image displayed by the image display section is visible only from a particular direction. Therefore, with this display device, the viewing angle is alterable when the user wants to view a confidential document in public places or view a captured image with many people.

In addition, the configuration controls the viewing angle through the control of birefringence. Therefore, a simple configuration can keep good display quality for the image display section.

Also in the multiple image display mode, the liquid crystal molecules may exhibit a similar alignment to the single image display mode in some regions in the liquid crystal layer in the display switching section. When this is the case, the image on the image display section is visible from a part of the regions if viewed from an oblique direction in the multiple image display mode.

In addition, as to the "major axis direction" when the liquid crystal molecules are projected, all directions are regarded as major axis directions when the projection is a perfect circle.

To achieve the objective, the viewing angle control device of the present invention is characterized as follows. The device includes a viewing angle control device for controlling a viewing angle for incident light for output, the device includes a liquid crystal element and a linear polarizer disposed on the liquid crystal element, wherein a major axis direction of liquid crystal molecules in the liquid crystal element is in a plane defined by a direction of a transmission axis or an absorption axis of the linear polarizer and a traveling direction of light; and the liquid crystal molecules can assume a state where the molecules are substantially vertical or substantially parallel to the traveling direction of light and a state where the molecules are tilted from a traveling direction of light.

By mounting such a viewing angle control device to display devices general used, the display devices are equipped with the aforementioned functions.

To achieve the objective, the electronic device of the present invention includes the aforementioned display device or viewing angle control device.

Therefore, the electronic devices obtained have a simple structure, but are capable of hiding the display image for particular directions by mode switching, while maintaining display quality.

To achieve the objective, the multiple image display device of the present invention is characterized in that it includes an optical element on either a front face or a back face of an image display section for displaying an ordinary image. The optical element is capable of electrically switching between a single image display mode where a single image is displayed across a viewing angle which is unique to the image display section and a multiple image display mode where different images are displayed for a front direction of the image display section and for side directions of the image display section.

With these features, in the single image display mode, the image displayed by the image display section is visible from any direction. In the multiple image display mode, the image displayed by the image display section is visible only from a particular direction. Therefore, with this multiple image display device, the viewing angle is alterable when the user wants to view a confidential document in public places or view a captured image with many people.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 5(*a*) illustrates how the display plane of the display section appears when it is viewed from the front. FIG. 5(*b*) illustrates the A-A' cross-section of the display section. FIG. 5(*c*) illustrates the B-B' cross-section.

FIG. 7(*a*) illustrates the A-A' cross-section of the display section. FIG. 7(*b*) illustrates the B-B' cross-section.

FIG. 8(*a*) illustrates the A-A' cross-section of the display section. FIG. 8(*b*) illustrates the B-B' cross-section.

FIG. 9(*a*) illustrates how the display plane of the display section appears when it is viewed from the front. FIG. 9(*b*) illustrates the A-A' cross-section of the display section. FIG. 9(*c*) illustrates the B-B' cross-section.

FIG. 10(*a*) illustrates the A-A' cross-section of the display section. FIG. 10(*b*) illustrates the B-B' cross-section.

FIG. 11(*a*) illustrates the A-A' cross-section of the display section. FIG. 11(*b*) illustrates the B-B' cross-section.

DESCRIPTION OF THE EMBODIMENTS

The following will describe an embodiment of the present invention in reference to FIG. 1 through FIG. 15.

Figure 2:
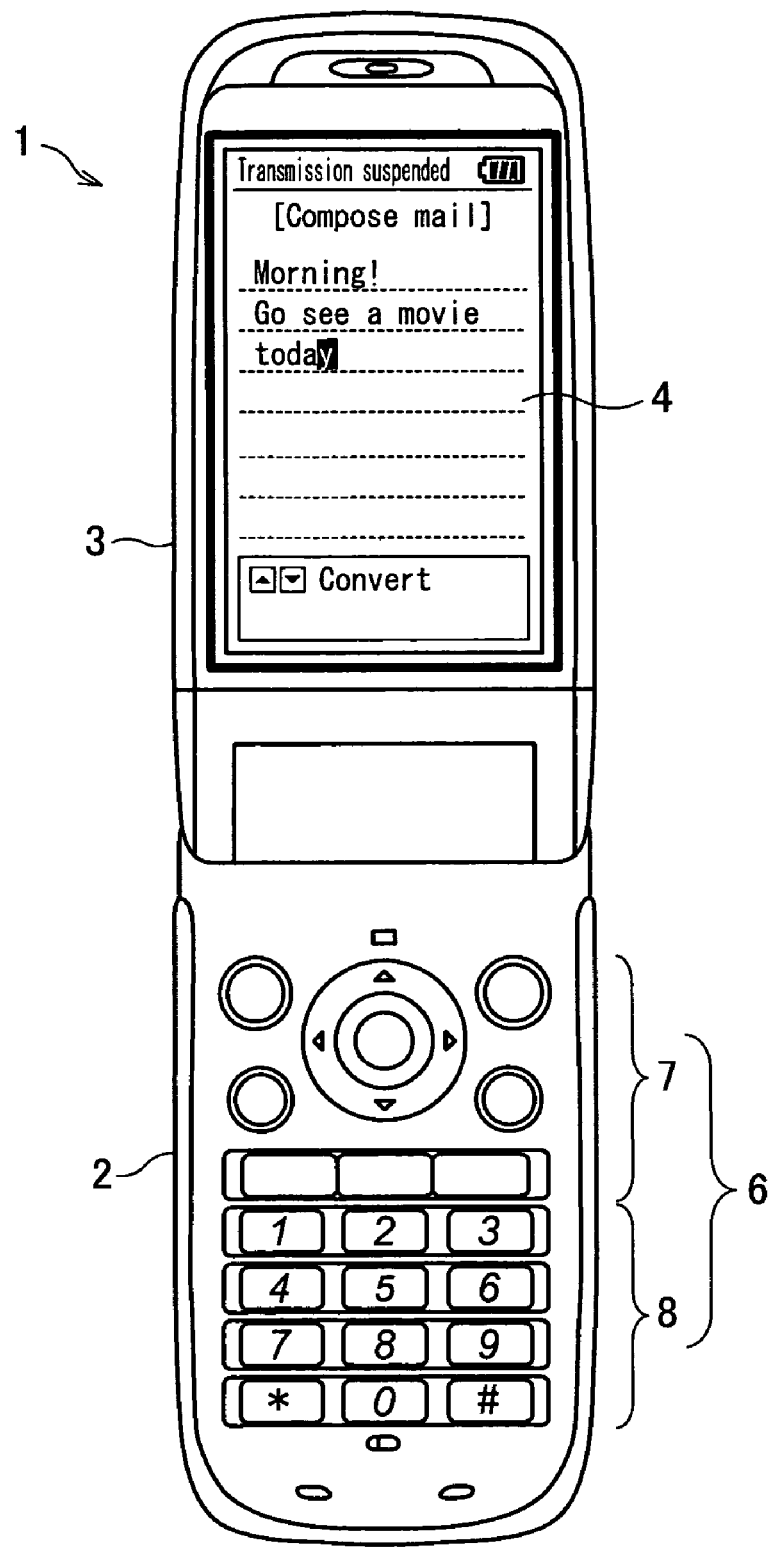
FIG. 2 is a drawing of a mobile phone in accordance with an embodiment of the present invention.

FIG. 2 shows the appearance of a mobile phone (electronic device) 1 which is an embodiment of the present invention. The mobile phone 1 of the present embodiment is of a so-called clamshell type. The figure shows the phone 1 when it is opened. The parts shown in FIG. 2 become accessible to the user when the mobile phone 1 is open and go inside the phone 1 when it is closed. In the present application, the side shown in FIG. 2 is designated as the front.

Still referring to FIG. 2, the mobile phone 1 has a main body 2 and a lid 3. The main body 2 and the lid 3 are hinged together. The lid 3 has a display section (display device, multiple image display device) 4 on the front side.

The main body 2 has a set of main operation buttons 6 on the front side. The main operation button set 6 includes a set of function buttons 7 enabling various settings and function switching on the mobile phone 1 and a set of input buttons 8 enabling inputs of alphanumerical and other characters and symbols. Specifically, the function button set 7 includes: a power supply button to turn on/off the power supply to the mobile phone; a camera button to start up an image capture mode; an email button to start up an email mode; a cross button to move a selected target up/down and to the left/right; and an enter button, located at the center of the cross button, to determine various selections. The input button set 8 consists of ten keys.

When displaying a main image, such as the body of an email or a captured image, on the display section 4, the mobile phone 1 of the present invention is capable of displaying another image on the display section 4 for observers not in front of the phone 1. In the following, these settings in which the body of an email or captured image is invisible to the observer not in front of the phone 1 are termed the narrow viewing angle mode (or the multiple image display mode). The ordinary mode where the display on the display section 4 is visible from any angle is termed the wide viewing angle mode (or the single image display mode). The user can change settings between the narrow viewing angle mode and the wide viewing angle mode as he likes by means of an operation button.

Figure 3:
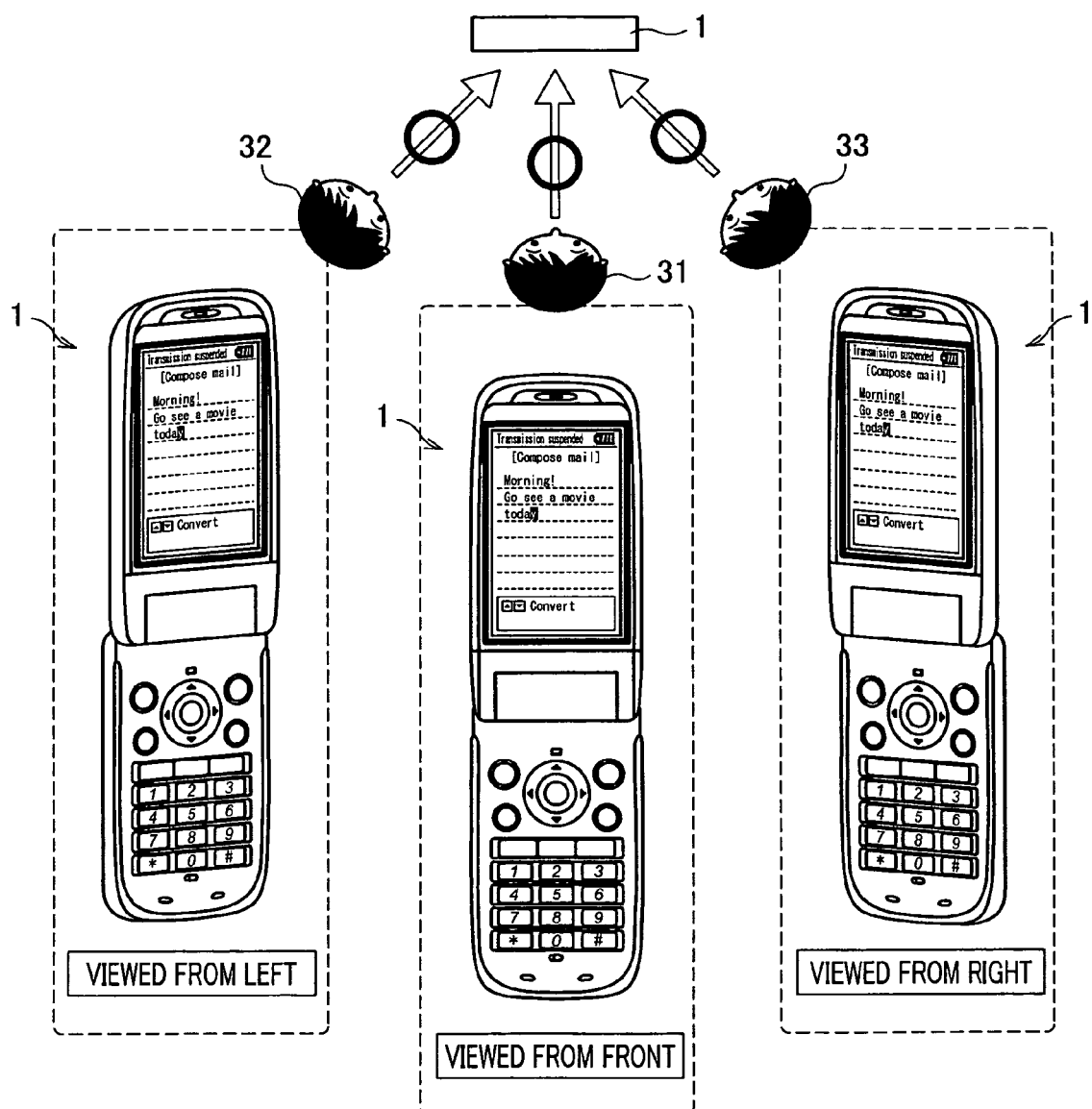
FIG. 3 is a drawing of a display section as viewed from the front and oblique directions when a mobile phone in accordance with an embodiment of the present invention is set to a single image display mode.
Figure 4:
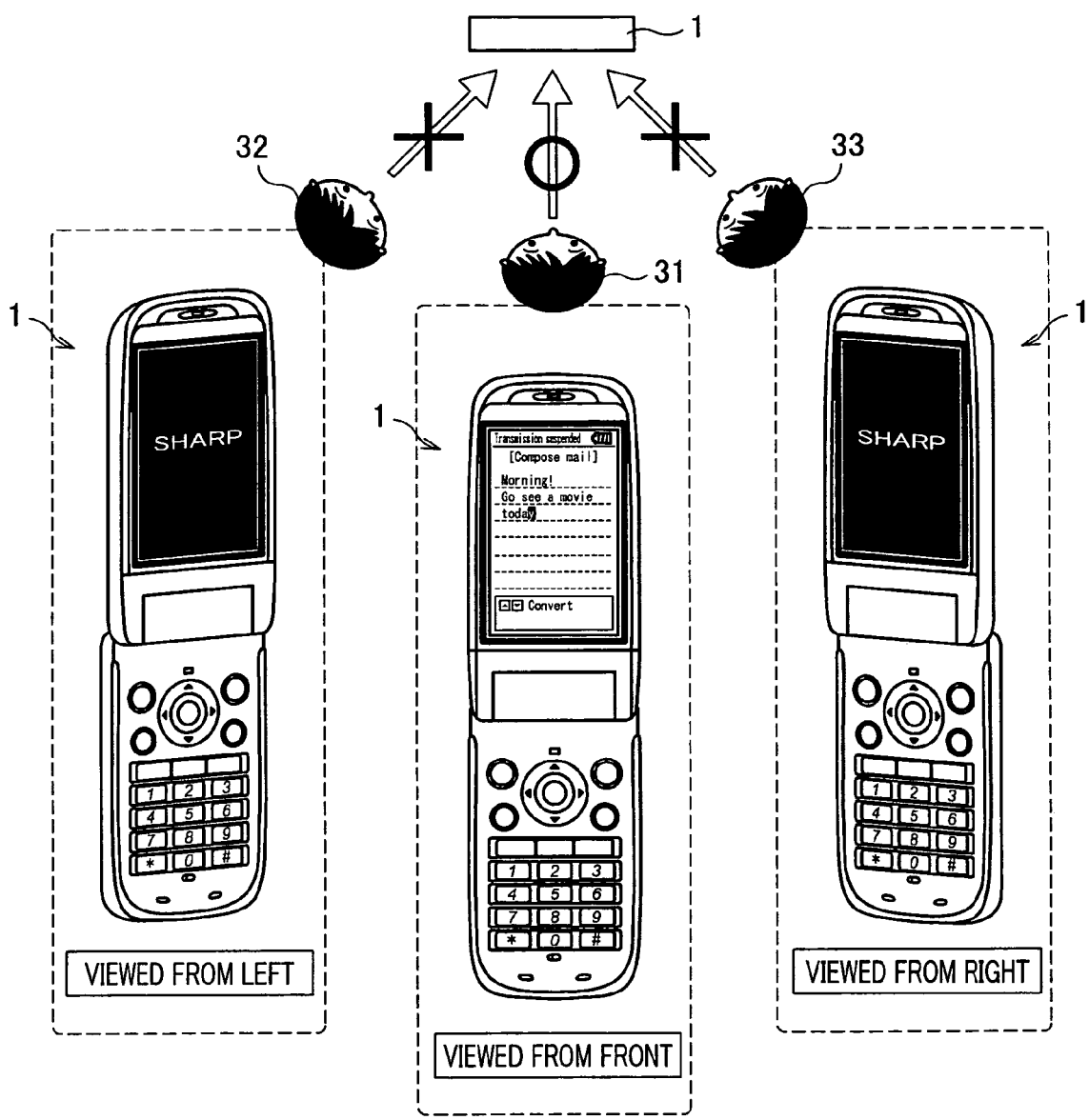
FIG. 4 is a drawing of a display section as viewed from the front and oblique directions when a mobile phone in accordance with an embodiment of the present invention is set to a multiple image display mode.

Now referring to FIG. 3, in the wide viewing angle mode, the main image is visible when viewed right in front of the display section 4 (front direction), obliquely rightward off the front as facing the display section 4 (rightward direction), and obliquely leftward off the front as facing the display section 4 (leftward direction). In contrast, in the narrow viewing angle mode, as shown in FIG. 4, the main image is visible when viewed from the front. When viewed from the rightward or leftward direction, however, the display is switched to show a "SHARP" logo on a black background.

The following will describe the structure of the display section 4 in more detail.

Figure 1:
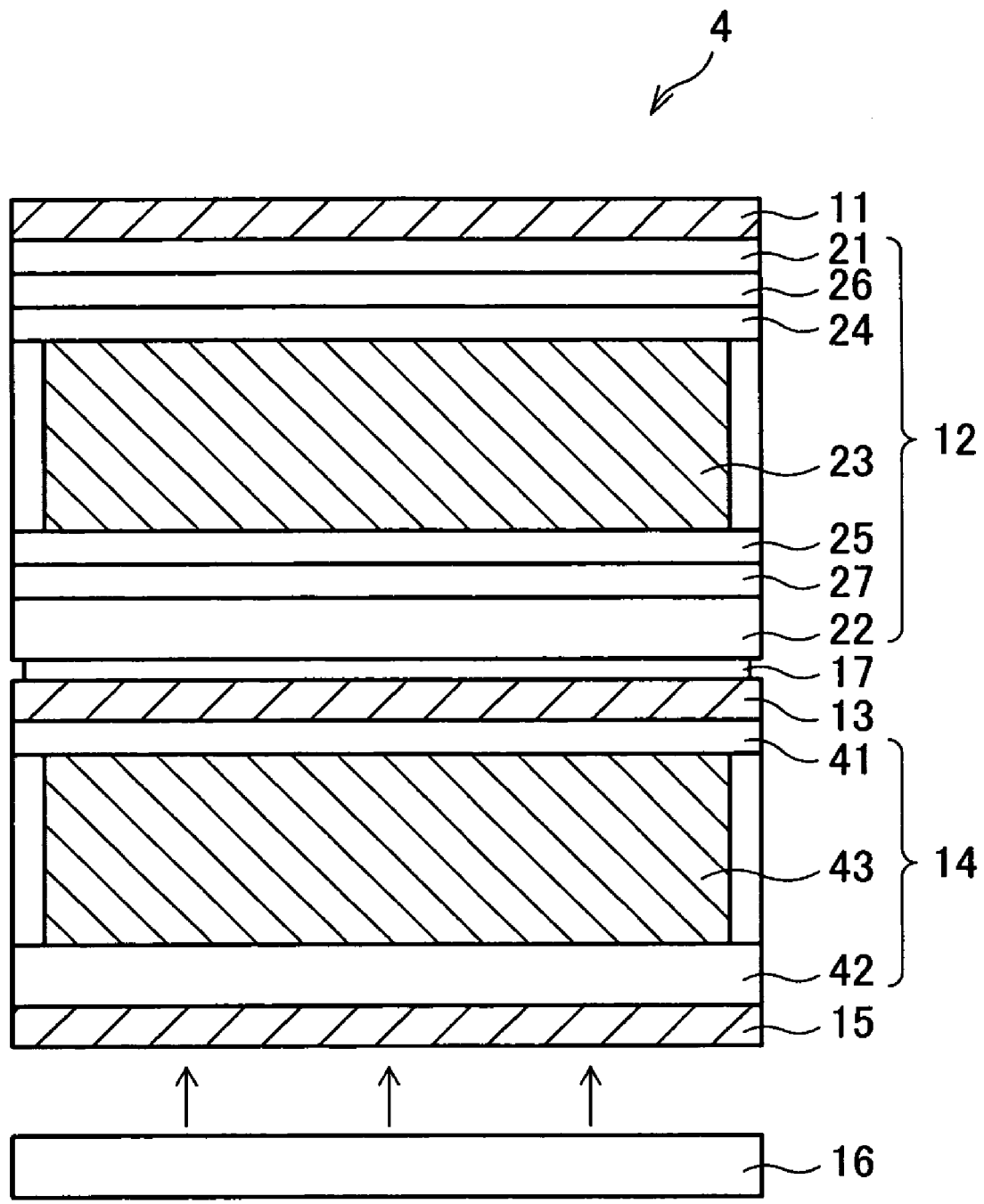
FIG. 1 is a cross-sectional view of a display section of a mobile phone in accordance with an embodiment of the present invention.

A cross-sectional view of the display section 4 is shown in FIG. 1. The display section 4 includes a second polarizer (second polarizing means, linear polarizer) 11, a switching liquid crystal display section (display switching means, optical element; hereinafter, "SW LCD") 12, a first polarizer (first polarizing means) 13, a main liquid crystal display section (image display means; hereinafter, "main LCD") 14, and a third polarizer 15 being stacked in this order. The display section 4 also includes a backlight 16 facing the third polarizer 15.

The polarized-light-transmission axis of the first polarizer 13 is preferably parallel to the polarized-light-transmission axis of the second polarizer 11. The polarized-light-transmission axis of the first polarizer 13 however may possibly be at any angle depending on requirements by the properties of the main LCD 14.

When this is the case, substantially the same effects as when the polarized-light-transmission axis of the first polarizer 13 is parallel to the polarized-light-transmission axis of the second polarizer 11 become obtainable by appropriately rotating the polarization direction of linearly polarized light which exits the first polarizer 13 with a given axis angle through the use of a half-wave plate, for example, so that the polarization direction matches with the polarized-light-transmission axis of the second polarizer 11.

The second polarizer 11 is attached to the SW LCD 12. The first polarizer 13 and the third polarizer 15 are attached to the respective surfaces of the main LCD 14. The main LCD 14 is pasted to a surface of the SW LCD 12 opposite the second polarizer 11 by the adhesion section 17 via the first polarizer 13. The combination of the second polarizer 11 and the SW LCD 12 works as a viewing angle control device. The adhesion section 17 may be adhered by a heat- or ultraviolet-curing resin-based adhesive or so-called double-face adhesive tape. In the adhesion, the surface may be adhered either entirely or partly (e.g., only the edge).

The main LCD 14 contains a liquid crystal layer 43 between transparent electrode substrates 41, 42. Applying voltage to the transparent electrode substrates 41, 42 under the control of a control section (not shown) changes the alignment of liquid crystal molecules in the liquid crystal layer 43 to produce an image display. The main LCD 14 is controlled by a control section (not shown) so that it can show an operation screen for the mobile phone 1, photographs, the body of an email, and like images. The main LCD 14 may be a general, conventional liquid crystal display device operating in any mode; examples include active matrix TN (twisted nematic) LCDs and VA (Vertical alignment) LCDs. In addition, the main LCD 14 may be replaced with a self-luminous display device such as an organic EL (electroluminescence) display device or a plasma display device. The self-luminous display device needs no backlight 16.

The SW LCD 12 includes a substrate 21, a transparent electrode film 26, an aligning film 24, a liquid crystal layer 23, an aligning film 25, a transparent electrode film 27, and a substrate 22 formed in this order. Liquid crystal molecules in the liquid crystal layer 23 are aligned initially in a direction determined by the aligning films 24, 25. As voltage is applied to the transparent electrode films 26, 27 from a control section (not shown), the molecules change alignment direction. This change of alignment direction realizes switching between the narrow viewing angle mode and the wide viewing angle mode.

The liquid crystal layer 23 is disposed between the substrates 21, 22. Applying voltage to the transparent electrode films 26, 27 under the control of a control section (not shown) to change the alignment of the liquid crystal molecules in the liquid crystal layer 23, which in turn produces an image display. The control section changes the alignment direction of the liquid crystal molecules in the liquid crystal layer 23 between the wide viewing angle mode and the narrow viewing angle mode, depending on which mode is specified by the user. Only either one of the aligning films 24, 25 may be used.

The backlight 16 provides display light. The third polarizer 15 filters out linearly polarized light in a particular direction from the light from the backlight 16 which has not yet reached the main LCD 14. The first polarizer 13 filters out linearly polarized light in a particular direction from the light which has passed through the main LCD 14, but which has not yet entered the SW LCD 12. The second polarizer 11 filters out linearly polarized light in a particular direction from the light originating from the backlight 16 and having passed through the main LCD 14 and the SW LCD 12.

The following will describe changes in alignment of liquid crystal molecules in the SW LCD 12 in reference to FIG. 5(a) to FIG. 10(b). Four different liquid crystal molecule alignments will be described as examples.

EXAMPLE 1

Figure 5:
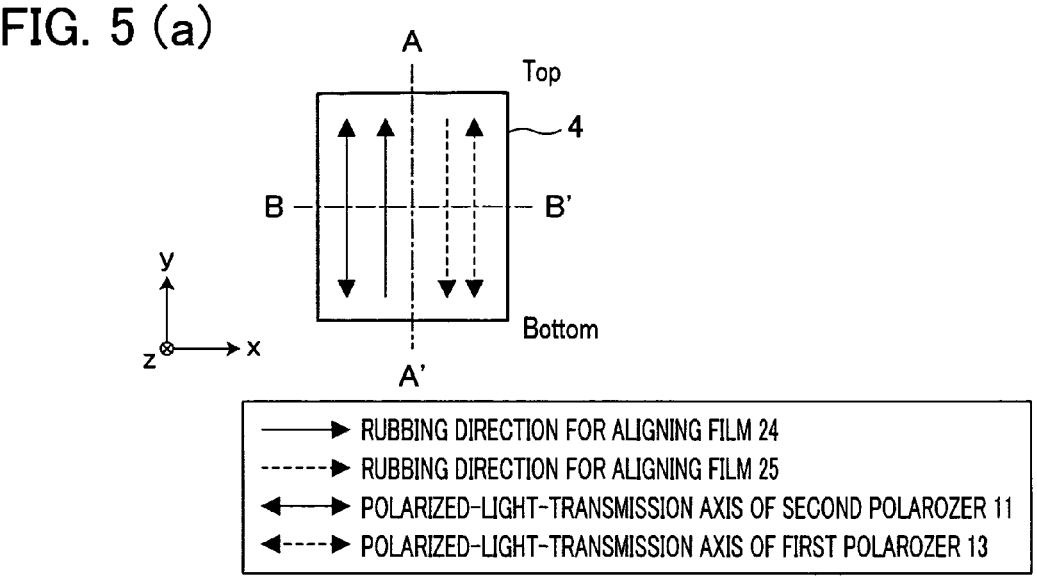
FIGS. 5(*a*), 5(*b*), and 5(*c*) show a display section when a mobile phone in accordance with an embodiment of the present invention is set to a single image display mode.
Figure 5:
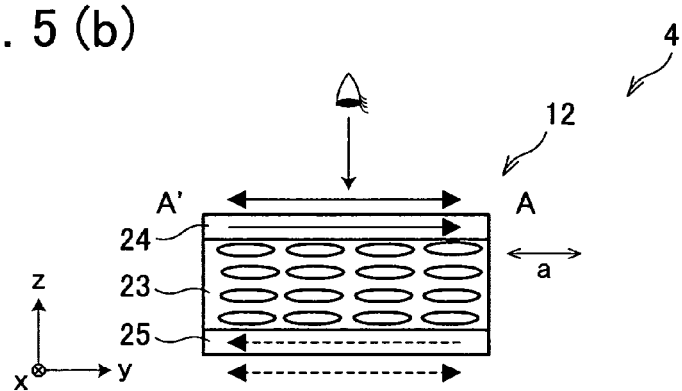
Figure 5:
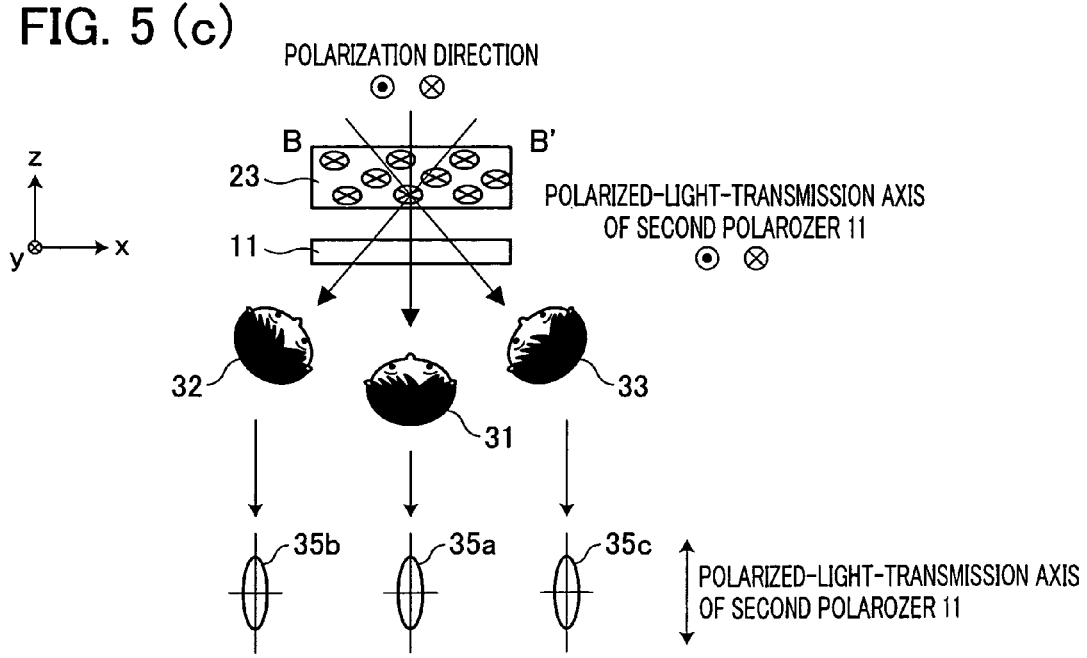

FIG. 5(a) shows the display plane of the display section 4 on the mobile phone 1. In the figure, the top/bottom direction of the image on the main LCD 14 matches with the top/bottom direction in the paper surface. In the following description, the left/right direction in the display screen is termed the x direction, the top/bottom direction is termed the y direction, and the thickness direction of the display section 4 is termed the z direction. FIGS. 5(a) to 10(b) omits the transparent electrode films 26, 27 and the aligning films 24, 25.

First, as shown in FIG. 5(a), the second polarizer 11 and the first polarizer 13 are disposed so that their polarized-light-transmission axes are directed along the y direction. The aligning films 24, 25 are rubbed parallel to the polarized-light-transmission axes of the first and second polarizers 13, 11, but in opposite directions to each other (antiparallel alignment directions). The aligning films 24, 25 are made of polyimide which gives horizontal alignment. The films 24, 25 hence align the liquid crystal molecules substantially parallel to the substrates 21, 22. Accordingly, the major axes of the liquid crystal molecules are uniaxially aligned substantially parallel to the polarized-light-transmission axis.

When this is the case, as shown in the A-A' cross-sectional view in FIG. 5(b), the liquid crystal molecules in the SW LCD 12 are uniaxially aligned substantially parallel to the polarized-light-transmission axis of the first polarizer 13 in the absence of applied voltage. The light which originates from the backlight 16 and enters the SW LCD 12 via the main LCD 14 has passed through the first polarizer 13; the polarization direction of the light entering the SW LCD 12 substantially matches with the alignment direction "a" of the liquid crystal molecules.

FIG. 5(c) shows how the liquid crystal molecules appear when the SW LCD 12 under the foregoing conditions is viewed by an observer shifting along the x direction. According to the figure, the liquid crystal molecules appear like the liquid crystal molecules 35a when projected from the front direction (when viewed by the observer 31). The major axis direction substantially matches with the polarization direction of the incident light. When the major axis direction in the projection of the liquid crystal molecules makes a 0° angle to the polarization direction of the incident light, the incident light transmits without being affected by birefringence; the image on the main LCD 14 is visible as it is. Similarly, the liquid crystal molecules appear like the liquid crystal molecules 35b, 35c when projected from a viewpoint off the front along the x direction (when viewed by the observers 32, 33). The major axis direction substantially matches with the polarization direction of the incident light. Therefore, the image on the main LCD 14 is visible. To sum it up, the image on the main LCD 14 is visible from any direction. This state, that is, the state in the absence of applied voltage, is designated the wide viewing angle mode.

Figure 7:
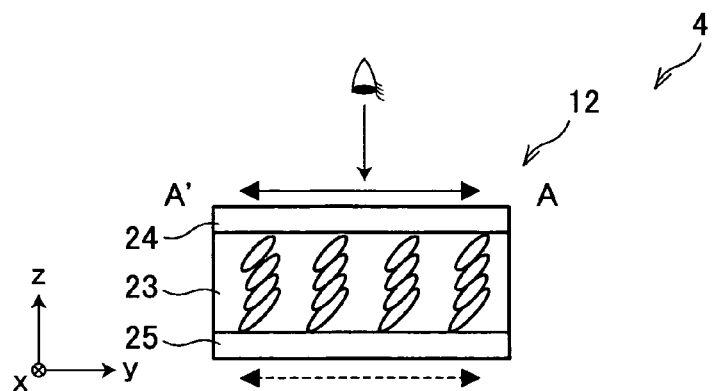
FIGS. 7(*a*) and 7(*b*) show a display section when a mobile phone in accordance with an embodiment of the present invention is set to a multiple image display mode.
Figure 7:
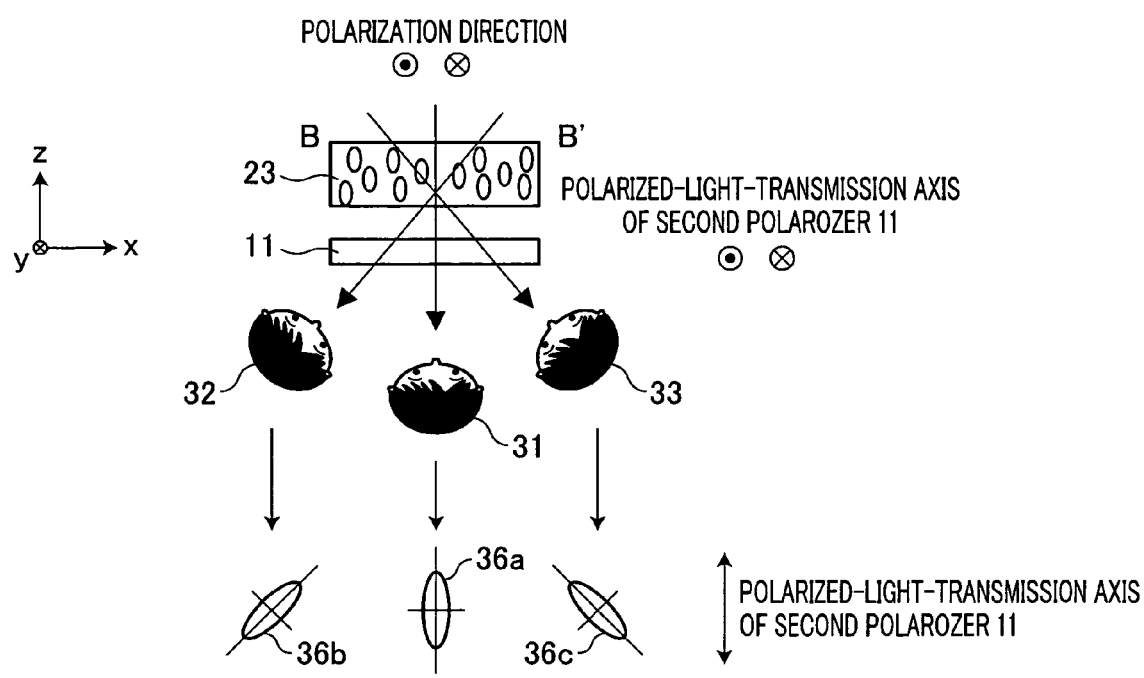

In contrast, to switch to the narrow viewing angle mode, an AC voltage (for example, 3V at 100 Hz) is applied to the transparent electrode films 26, 27 in a state where no voltage is applied, so that the liquid crystal molecules tilt 45° from the substrates 21, 22 by rotation around the x direction. The liquid crystal molecules under these conditions are shown in FIGS. 7(*a*), 7(*b*). FIG. 7(*a*) is an A-A' cross-section. It could be understood that the molecules tilt 45° from the substrates 21, 22. FIG. 7(*b*) is a B-B' cross-section. The liquid crystal molecules tilt about 45° from the normal to the paper surface.

When this is the case, as shown in FIG. 7(*b*), the liquid crystal molecules as viewed by the observer 31, that is, the projection of the liquid crystal molecules from the front direction, appears like liquid crystal molecules 36*a*. The change in alignment of the liquid crystal molecules is caused by the rotation around the x axis. Thus, the polarization direction of the second polarizer 11 and the first polarizer 13 always matches with the major axis direction of the liquid crystal molecules 36*a*. Therefore, when viewed from the front direction (by the observer 31 in FIG. 7), the image on the main LCD 14 is not affected by birefringence and visible as it is.

In contrast, the liquid crystal molecules as viewed by the observer 32 who is off the front toward the left as facing the display section 4, that is, the projection of the liquid crystal molecules from the left-hand side as facing the substrates 21, 22, appears like liquid crystal molecules 36*b*. When this is the case, the polarization direction of the second polarizer 11 and the first polarizer 13 makes an angle to the major axis direction in the projection of the liquid crystal molecules (liquid crystal molecules 36*b*). Hence, the major axis direction in the projection of the liquid crystal molecules makes a cross angle to the polarization direction of the incident light. Therefore, when viewed by the observer 32, the image on the main LCD 14 is not visible because light is affected by the birefringence of the liquid crystal and does not pass through the SW LCD 12.

Similarly, the liquid crystal molecules as viewed by the observer 33 who is off the front toward the right as facing the display section 4, that is, the projection of the liquid crystal molecules from the right-hand side as facing the substrates 21, 22, appears like liquid crystal molecules 36*c*. The polarization direction of the second polarizer 11 and the first polarizer 13 makes an angle to the major axis direction in the projection. Hence, the major axis direction in the projection of the liquid crystal molecules makes a cross angle to the polarization direction of the incident light, and the polarization direction rotates. Therefore, when viewed by the observer 33, the image on the main LCD 14 is not visible because light is affected by the birefringence of the liquid crystal and does not pass through the SW LCD 12.

In the foregoing mechanism, with voltage applied to the transparent electrode films 26, 27, the image on the main LCD 14 is not affected by birefringence and visible as it is as shown in FIG. 4 when the display section 4 is viewed from the front direction (viewed by the observer 31). When viewed from a direction other than the front direction (viewed by the observers 32, 33), however, the image on the main LCD 14 is not visible because light is affected by birefringence and does not pass through the SW LCD 12.

In the narrow viewing angle mode, the alignment direction of the liquid crystal molecules is not limited to the 45° tilt from the substrates 21, 22. The molecules may tilt at any tilt angle from the substrates 21, 22. The tilt angle only needs to be greater than the tilt angle of the alignment direction when it is substantially parallel to the substrates 21, 22 and less than the tilt angle of the alignment direction when it is substantially vertical to the substrates 21, 22, that is, greater than 0° and less than 90°. The tilt angle is preferably not less than 10° and not more than 80°, more preferably not less than 40° and not more than 50°. The closer to 45° the tilt angle, the greater the birefringence and the better the image is hidden. Further, a small tilt angle requires a low drive voltage and saves power consumption.

When the observer shifts in the y direction, the major axis direction in the projection of the liquid crystal molecules does not change. Whether the main LCD 14 is visible or not depends only on a shift of the viewpoint in the x direction. Therefore, the line of sight from a direction parallel to the y-z plane (the plane drawn by points on the liquid crystal molecules when they are rotated to change the alignment direction) is designated as the line of sight from the front direction.

Figure 6:
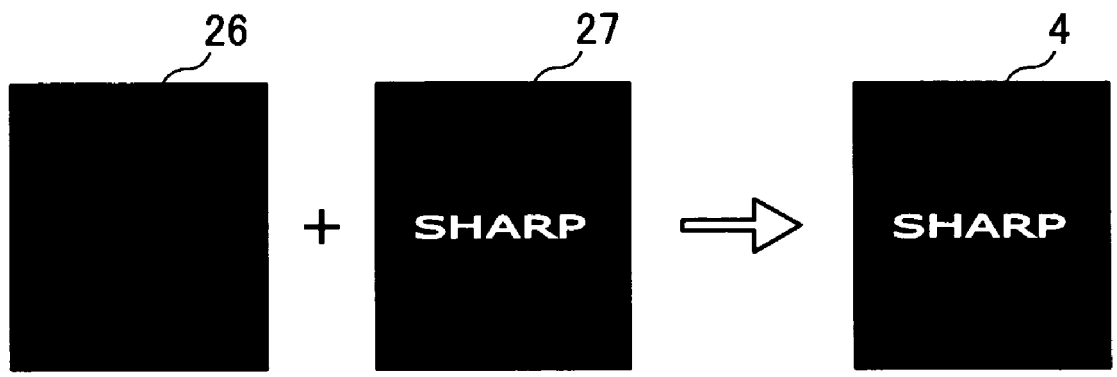
FIGS. 6(*a*) and 6(*b*) are drawings showing a transparent electrode film disposed over a display section in accordance with an embodiment of the present invention.
Figure 6:
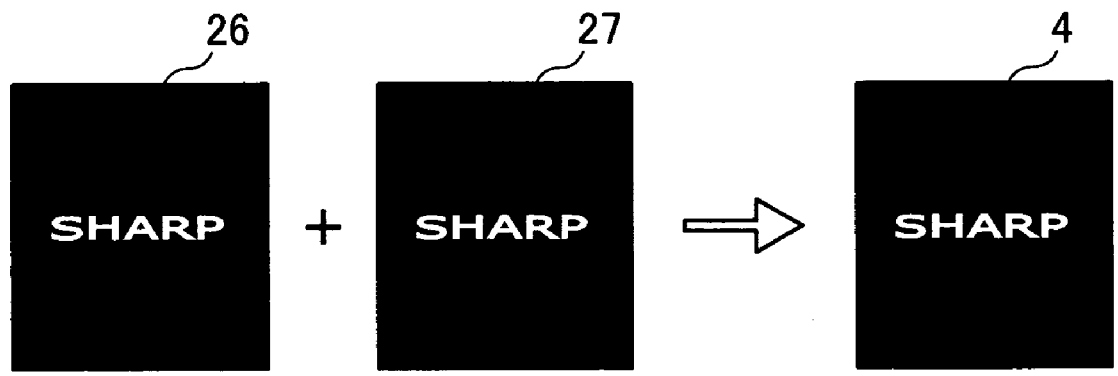

In addition, either both (FIG. 6(*b*)) or one (FIG. 6(*a*)) of the transparent electrode films 26, 27 has/have an electrode pattern in which electrodes (black parts) are formed outside a logo part where a white "SHARP" logo is provided. Accordingly, in the logo part where voltage is applied to at least one of the transparent electrode films, the liquid crystal molecules are under no applied voltage. The alignment direction is substantially parallel to the substrates 21, 22 as in the absence of applied voltage. Therefore, only the logo part is not affected by the birefringence of the SW LCD 14, from no matter which direction it is viewed. Therefore, the observers 32, 33 see the logo image on the display section 4 in FIGS. 6(*a*), 6(*b*) where light is blocked by the non-logo part, and light transmits through the logo part.

For the purpose of hiding the image on the main LCD 14, the patterned electrodes preferably cover not less than 60%, more preferably not less than 80%, of the display section 4. However, to simply superpose the image on the SW LCD 12 onto the image on the main LCD 14, the patterned electrodes may be arranged in any manner.

EXAMPLE 2

Figure 8:
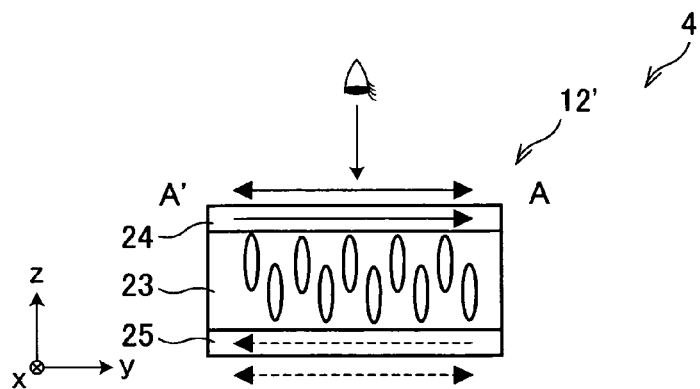
FIGS. 8(*a*) and 8(*b*) show a display section when a mobile phone in accordance with another embodiment of the present invention is set to a single image display mode.
Figure 8:
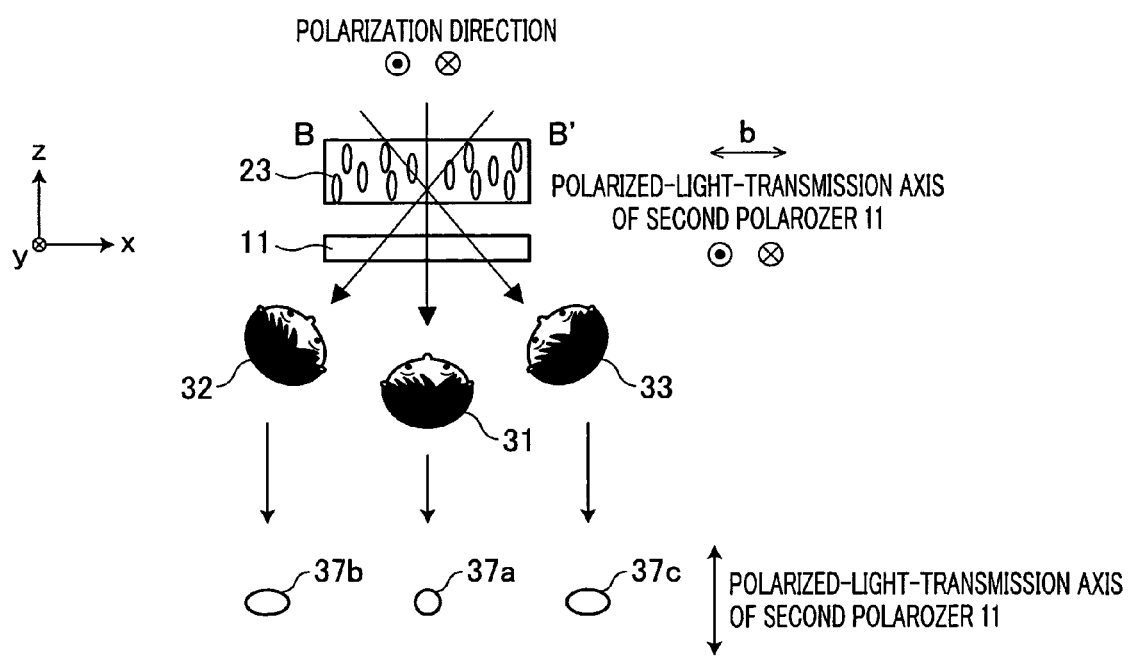

Example 2 of the alignment of liquid crystal molecules in a SW LCD 12 will be described in reference to FIGS. 8(*a*), 8(*b*). In example 2, the SW LCD 12 is replaced with a SW LCD 12' containing aligning films made of polyimide which gives the molecules vertical alignment, instead of the aligning films 24, 25. Accordingly, the liquid crystal molecules are aligned substantially vertical to the electrode substrates 21, 22 as in FIG. 8(*a*).

When this is the case, the liquid crystal molecules in the SW LCD 12' are uniaxially aligned substantially vertical to the substrates 21, 22 in the absence of applied voltage. That is, the liquid crystal molecules appear like perfectly round liquid crystal molecules 37*a* when viewed from the front (when the projection is a perfect circle, all directions are regarded as major axis directions). When viewed from a direction other than the front, the major axis directs along the x direction as with liquid crystal molecules 37*b*, 37*c*. Therefore, the major axis direction b is at right angles to the polarization direction of incident light if projected from any direction including the front direction. When the major axis direction in the projection of the liquid crystal molecules is at right angles to the polarization direction of incident light, the incident light passes through without being affected by birefringence. Therefore, the image on the main LCD 14 is visible as it is when viewed from any angle. This state, that is, no applied voltage state, is designated as the wide viewing angle mode.

In contrast, to switch to the narrow viewing angle mode, AC voltage is applied to the transparent electrode films 26, 27 in the wide viewing angle mode so that the liquid crystal molecules tilt 45° from the substrates 21, 22 by rotation around the x direction. The liquid crystal molecules under these conditions are the same as in example 1 of alignment in a SW LCD 12 in FIGS. 7(*a*), 7(*b*).

Therefore, the molecules behave according to the same mechanism: With voltage applied to the transparent electrode films 26, 27, as shown in FIG. 4, the image on the main LCD 14 is not affected by birefringence and is visible as it is when the display section 4 is viewed from the front direction (viewed by the observer 31). When viewed from a direction other than the front direction (viewed by the observers 32, 33), the image is affected by birefringence, and the logo image becomes visible.

EXAMPLE 3

Figure 9:
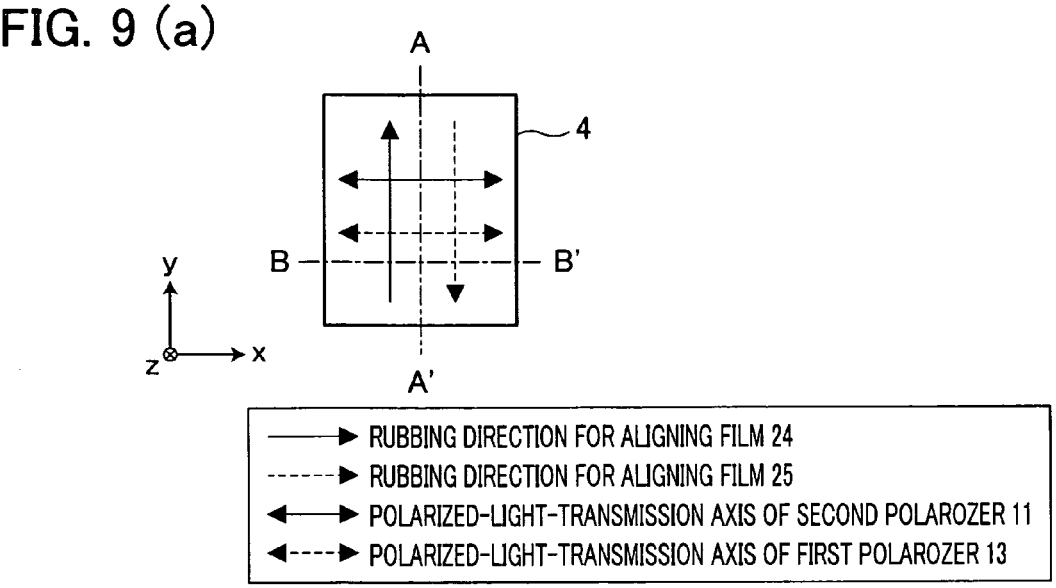
FIGS. 9(*a*), 9(*b*), and 9(*c*) show a display section when a mobile phone in accordance with another embodiment of the present invention is set to a single image display mode.
Figure 9:
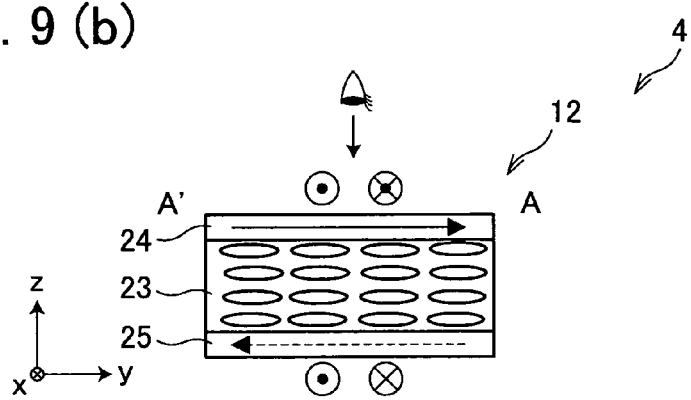
Figure 9:
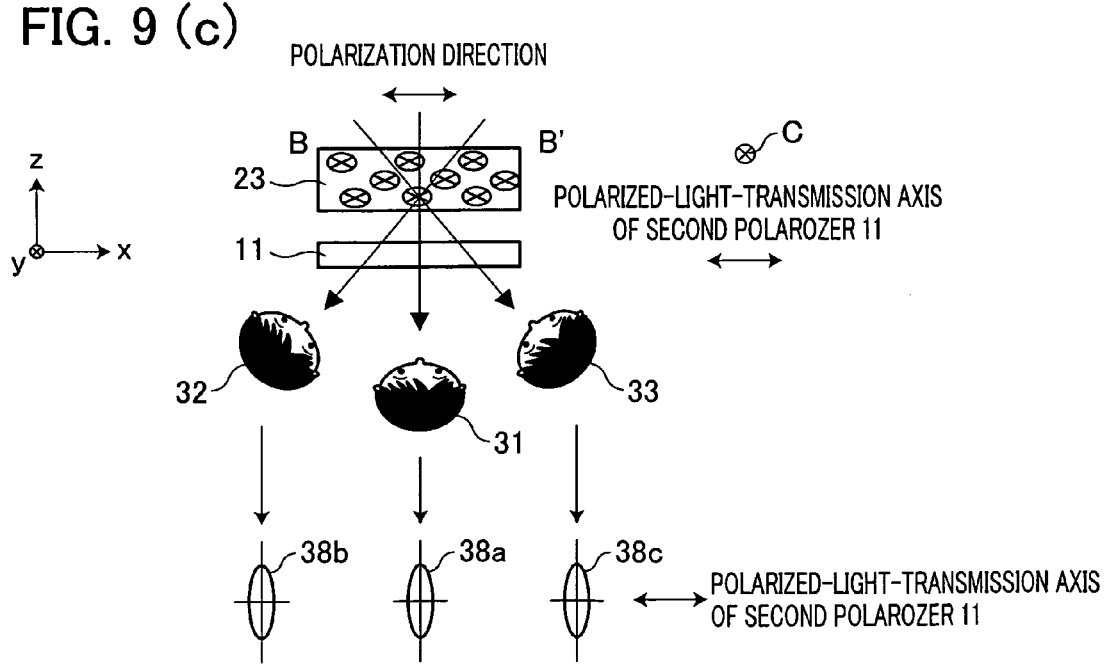

FIG. 9(*a*) shows the display section 4 on the mobile phone 1. In the figure, the top/bottom direction of the display screen matches with the top/bottom direction in the paper surface.

First, as shown in FIG. 9(*a*), the first polarizer 13 and the second polarizer 11 are disposed so that their polarized-light-transmission axes are directed along the x direction. The aligning films 24, 25 are rubbed vertical to the polarized-light-transmission axes of the first and second polarizers 13, 11 (y direction) but in opposite directions to each other (anti-parallel alignment directions). The aligning films 24, 25 are made of polyimide which gives horizontal alignment. The films 24, 25 hence align the liquid crystal molecules substantially parallel to the substrates 21, 22. Accordingly, the major axis direction of the liquid crystal molecules are uniaxially aligned substantially at right angles to the polarized-light-transmission axis of the polarizer as shown in FIG. 9(*b*).

When this is the case, as shown in FIG. 9(*b*), the liquid crystal molecules in the SW LCD 12 are uniaxially aligned parallel to the substrates 21, 22 and at right angles to the polarized-light-transmission axis of the first polarizer 13 in the absence of applied voltage. The light which originates from the backlight 16 and enters the SW LCD 12 via the main LCD 14 has passed through the first polarizer 13; the polarization direction of the light entering the SW LCD 12 is at right angles to the alignment direction of the liquid crystal molecules. FIG. 9(*c*) shows how the liquid crystal molecules appear when the SW LCD 12 under the foregoing conditions is viewed by an observer shifting along the x direction. According to the figure, the liquid crystal molecules appear like the liquid crystal molecules 38*a* when projected from the front direction (when viewed by the observer 31). The projected major axis direction c of the liquid crystal molecules is at right angles to the polarization direction of the incident light. When the major axis direction in the projection of the liquid crystal molecules is at right angles to the polarization direction of incident light, the incident light is not affected by birefringence and passes through. Therefore, the image on the main LCD 14 is visible as it is when viewed from any angle. This state, that is, no applied voltage state, is designated as the wide viewing angle mode.

Figure 10:
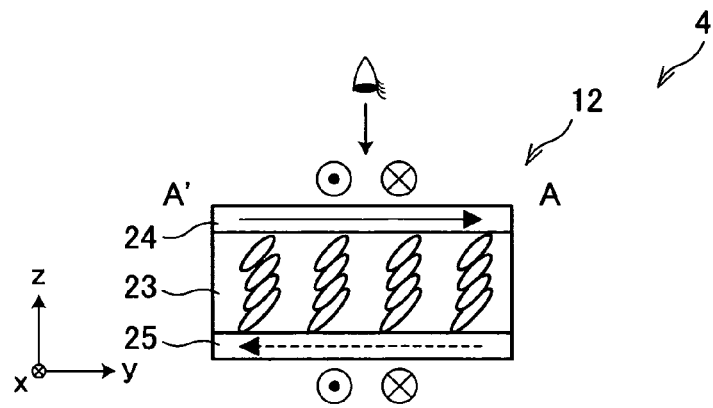
FIGS. 10(*a*) and 10(*b*) show a display section when a mobile phone in accordance with another embodiment of the present invention is set to a multiple image display mode.
Figure 10:
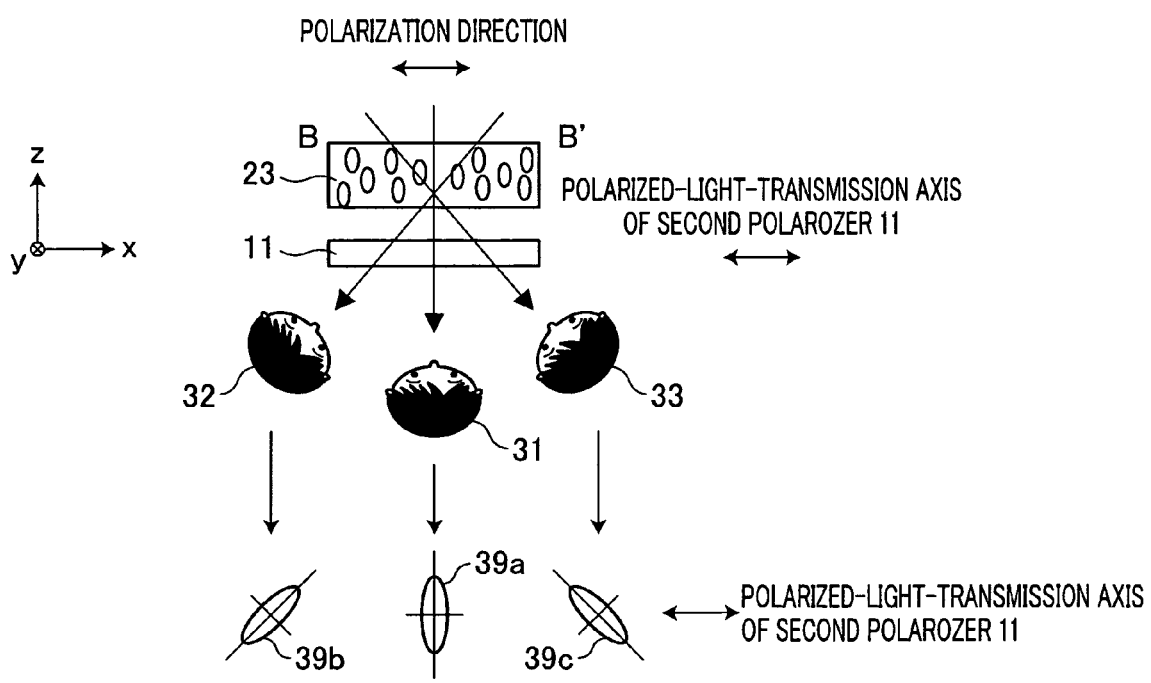

In contrast, to switch to the narrow viewing angle mode, AC voltage is applied to the transparent electrode films 25, 26 in the no applied voltage state so that the liquid crystal molecules tilt 45° from the substrates 21, 22 by rotation around the x direction. The liquid crystal molecules under these conditions are shown in FIGS. 10(*a*), 10(*b*). FIG. 10(*a*) is an A-A' cross-section. It could be understood that the molecules tilt 45° from the substrates 21, 22. FIG. 10(*b*) is a B-B' cross-section. The liquid crystal molecules tilt 45° from the normal to the paper surface.

When this is the case, as shown in FIG. 10(*b*), the liquid crystal molecules as viewed by the observer 31, that is, the projection of the liquid crystal molecules from the front direction, appears like liquid crystal molecules 39*a*. The change in alignment of the liquid crystal molecules is caused by the rotation around the x direction. Thus, the polarization direction of the second polarizer 11 and the first polarizer 13 is at right angles to the major axis direction of the liquid crystal molecules 39*a*. Therefore, the major axis direction in the projection of the liquid crystal molecules is substantially at right angles to the polarization direction of the incident light. Hence, when viewed from the front direction (viewed by the observer 31), the image on the main LCD 14 is not affected by birefringence and is visible as it is.

In contrast, the liquid crystal molecules as viewed by the observer 32 who is off the front toward the left as facing the display section 4, that is, the projection of the liquid crystal molecules from the left-hand side as facing the substrates 21, 22, appears like liquid crystal molecules 39*b*. the polarization direction of the second polarizer 11 and the first polarizer 13 makes an angle to the major axis direction in the projection. Hence, the major axis direction in the projection of the liquid crystal molecules makes a cross angle to the polarization direction of the incident light. Therefore, when viewed by the observer 32, the image on the main LCD 12 is not visible because light is affected by the birefringence of the liquid crystal and does not pass through the SW LCD 12.

Similarly, the liquid crystal molecules as viewed by the observer 33 who is off the front toward the right as facing the display section 4, that is, the projection of the liquid crystal molecules from the right-hand side as facing the substrates 21, 22, appears like liquid crystal molecules 39*c*. The polarization direction of the first polarizer 13 and the second polarizer 11 makes an angle to the major axis direction in the projection. Hence, the major axis direction in the projection of the liquid crystal molecules makes a cross angle to the polarization direction of the incident light. Therefore, when viewed by the observer 33, the image on the main LCD 14 is not visible because light is affected by the birefringence of the liquid crystal and does not pass through the SW LCD 12.

In the foregoing mechanism, with voltage applied to the transparent electrode films 26, 27, the image on the main LCD 14 is not affected by birefringence and visible as it is as shown in FIG. 4 when the display section 4 is viewed from the front direction (viewed by the observer 31). When viewed from a direction other than the front direction (viewed by the observers 32, 33), however, the image on the main LCD 14 is not visible because light is affected by birefringence and does not pass through the SW LCD 12.

EXAMPLE 4

Figure 11:
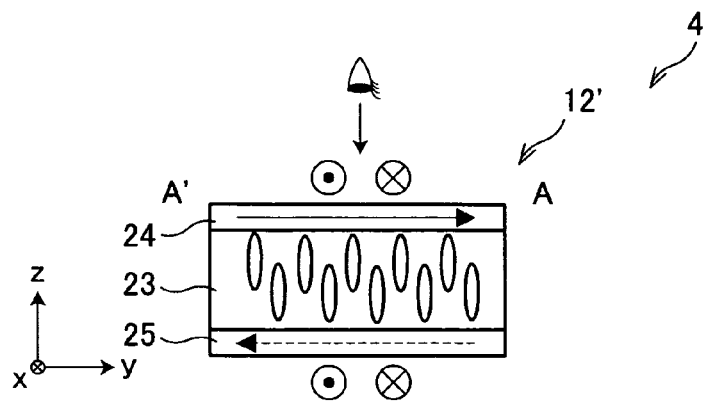
FIGS. 11(*a*) and 11(*b*) show a display section when a mobile phone in accordance with another embodiment of the present invention is set to a single image display mode.
Figure 11:
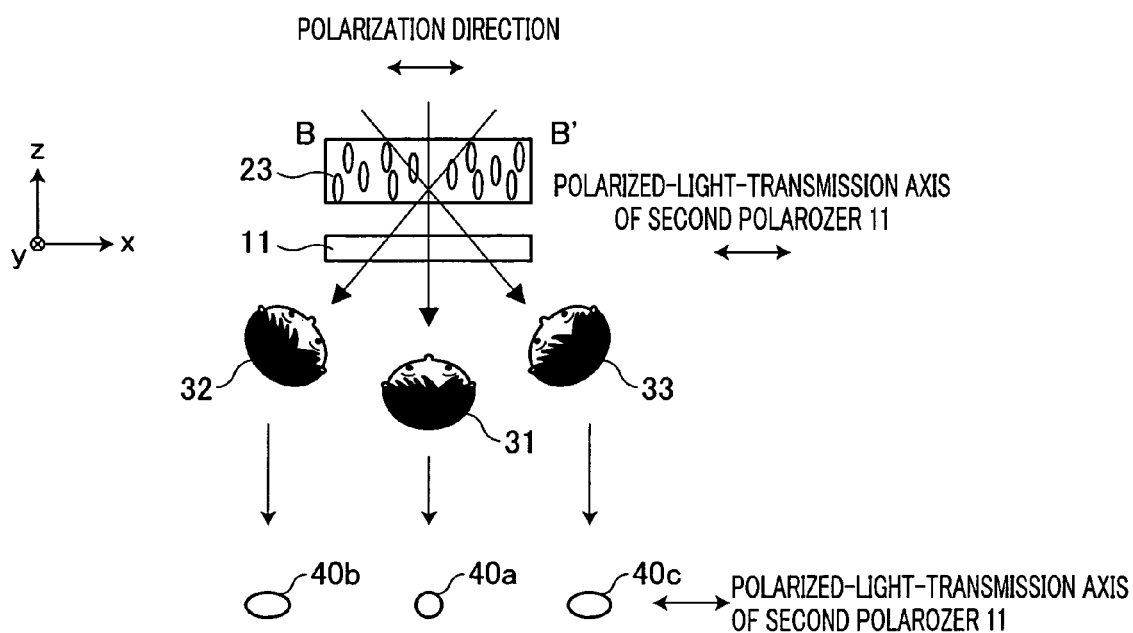

Example 4 of the alignment of liquid crystal molecules in a SW LCD will be described in reference to FIGS. 11(*a*), 11(*b*). Example 4 differs from example 3 where a SW LCD 12' is used which contains aligning films made of polyimide which gives the molecules vertical alignment in place of the aligning films 24, 25. Accordingly, the liquid crystal molecules are aligned substantially vertical to the substrates 21, 22.

When this is the case, the liquid crystal molecules in the SW LCD 12' are uniaxially aligned substantially vertical to the substrates 21, 22 in the absence of applied voltage. That is, the liquid crystal molecules appear like perfectly round liquid crystal molecules 40*a* shown in FIG. 11(*b*) when viewed from the front. When viewed from a direction other than the front, the major axis directs along the x direction as with the liquid crystal molecules 40*b*, 40*c*. Therefore, the major axis direction matches with the polarization direction of incident light if the liquid crystal molecules are projected from any direction including the normal to the substrates. When the major axis direction of the projection of the liquid crystal molecules makes a 0° (parallel) angle to the polarization direction of incident light, the incident light passes through without being affected by birefringence. Therefore, the image on the main LCD 14 is visible as it is when viewed from any angle. This state, that is, no applied voltage state, is designated as the wide viewing angle mode.

In contrast, to switch to the narrow viewing angle mode, AC voltage is applied to the transparent electrode films 26, 27 in the wide viewing angle mode so that the liquid crystal molecules tilt 45° from the substrates 21, 22 by rotation around the x direction. The liquid crystal molecules under these conditions are the same as in example 3 of alignment in a SW LCD in FIGS. 10(*a*), 10(*b*).

Therefore, the molecules behave according to the same mechanism: With voltage applied to the transparent electrode films 26, 27, as shown in FIG. 4, the image on the main LCD 14 is not affected by birefringence and is visible as it is when the display section 4 is viewed from the front direction (viewed by the observer 31). When viewed from a direction other than the front direction (viewed by the observers 32, 33), the image is affected by birefringence, and the logo image becomes visible.

(Experiments to Measure Transmittance)

Using the SW LCDs of examples 1, 3, change in transmittance with viewing direction was measured in the multiple image display mode. Results are shown in FIGS. 12, 13.

Figure 12:
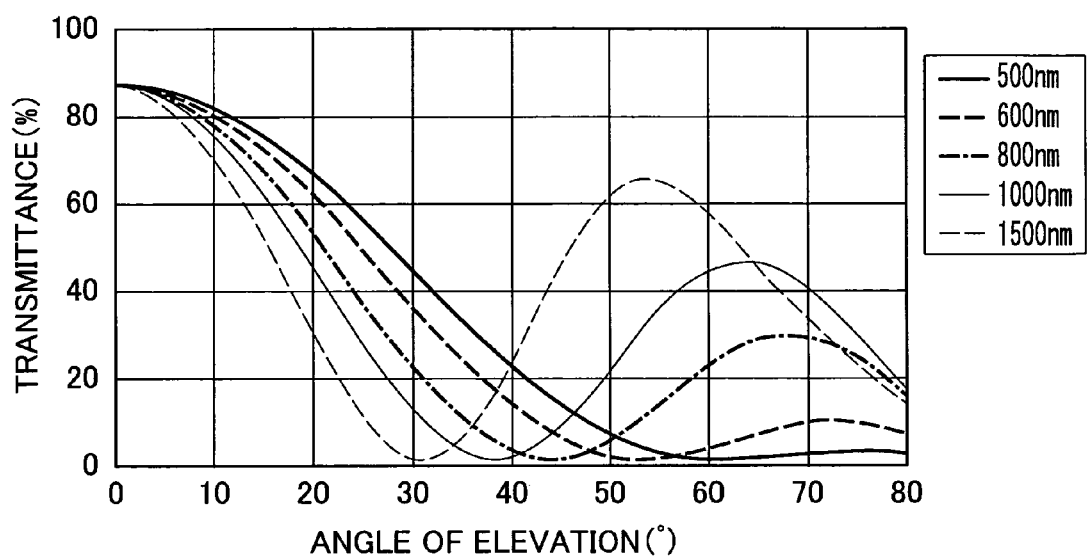
FIG. 12 shows a relationship between the angle of elevation of a line of sight and the transmittance of a SW LCD in accordance with an embodiment of the present invention.
Figure 13:
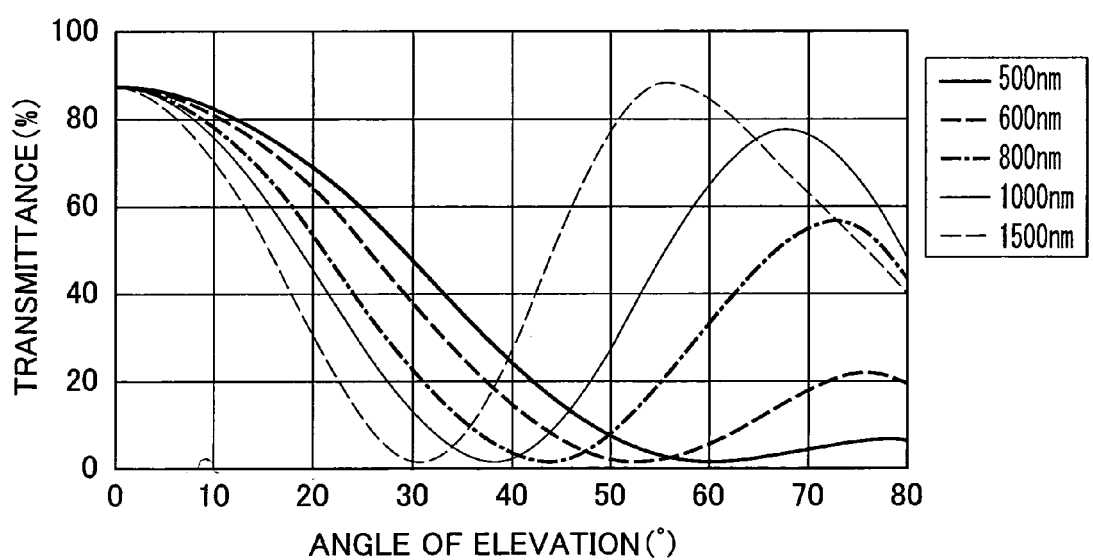
FIG. 13 shows a relationship between the angle of elevation of a line of sight and the transmittance of a SW LCD in accordance with another embodiment of the present invention.
Figure 14:
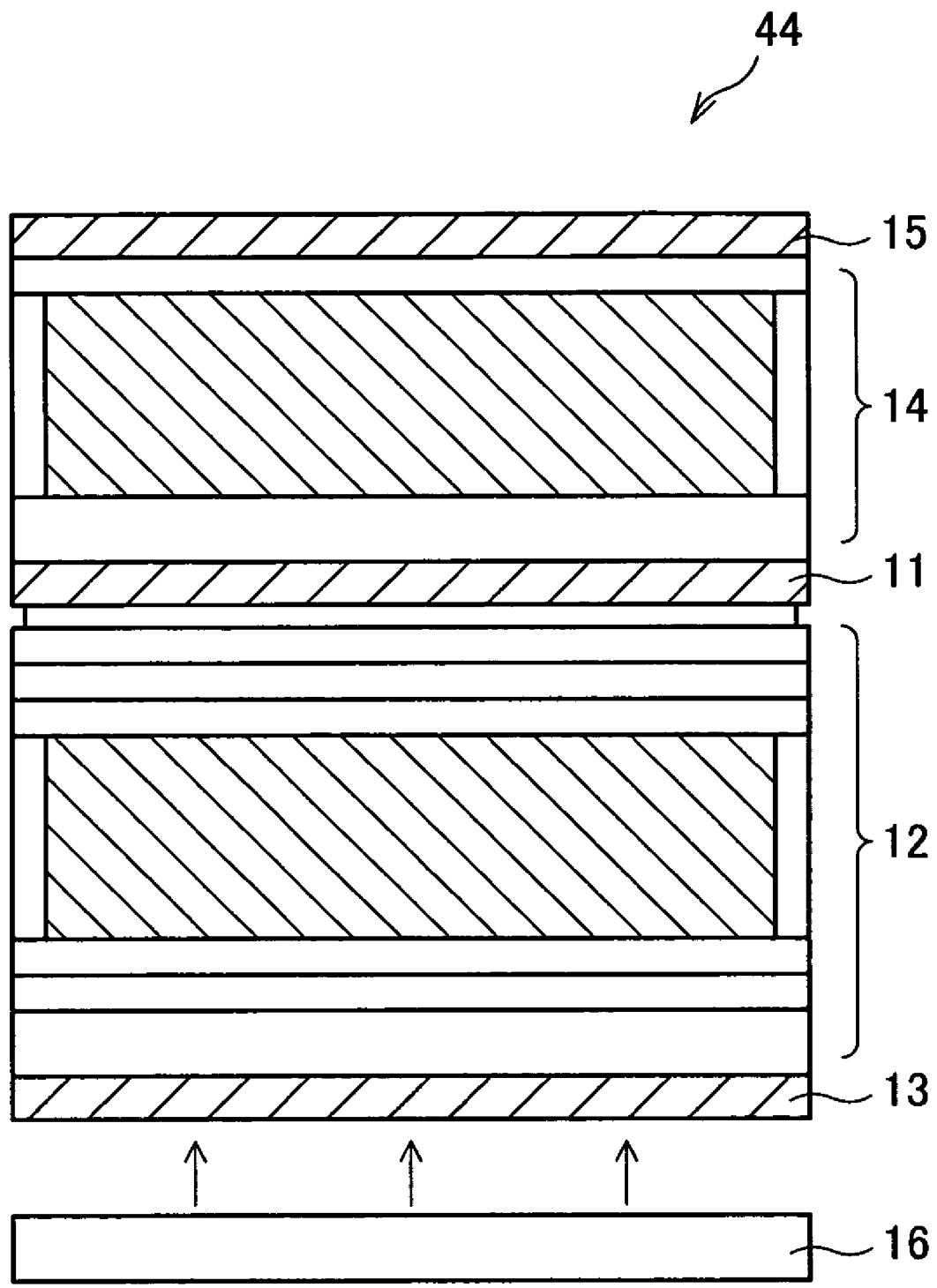
FIG. 14 is a cross-sectional view of a display section of a mobile phone in accordance with another embodiment of the present invention.

FIG. 12 is a graph representing measurements on SW LCDs of example 1 in the multiple image display mode. The SW LCDs were oriented so that the polarized-light-transmission axis of the first polarizer was in the top/bottom direction. The line of sight was normal to the display section 4 (angle of elevation=0°) The viewpoint was shifted to the left/right whilst the target point was fixed. The viewpoint was shifted from 0° to 80° (the line of sight makes 80° to the normal to the display section 4) in terms of angle of elevation. The angles of elevation of the line of sight and the transmittances of the SW LCDs as viewed from the line of sight were measured. In the graph, the horizontal axis indicates the angle of elevation, and the vertical axis indicates the transmittance. In addition, the SW LCDs had a retardation of 500 nm, 600 nm, 800 nm, 1000 nm, and 1500 nm when viewed from the front respectively.

All the SW LCDs exhibited a maximum transmittance of about 85% when the angle of elevation was 0°. The transmittance decreased with increase in the angle of elevation. With the 1500-nm retardation SW LCD, the transmittance was substantially 0% when the angle of elevation was about 30°. With the angle of elevation being further increased, the transmittance increased again. The transmittance was substantially 0% when the angle of elevation was about 38° in the 1000-nm retardation SW LCD and when the angle of elevation was about 44° in the 800-nm retardation SW LCD. In addition, the transmittance was a minimum when the angle of elevation was about 50° and 60° in the 600-nm and 500-nm retardation SW LCDs respectively. With the angle of elevation being further increased, the transmittance remained less than or equal to 10%.

The retardation of the SW LCD may be determined in accordance with the direction in which one does not want the main LCD to be visible or in accordance with required decrease in the transmittance determined in view of operating environment, the luminance of the main LCD, and other conditions. For example, to hide the image on the main LCD from the line of sight at an angle of elevation of about 45°, a SW LCD can be used which exhibits a low transmittance at that angle of elevation and a retardation of 500 nm to 1000 nm. To hide the image on the main LCD primarily from the line of sight at angles of elevation of 30° to 50°, a SW LCD can be used which exhibits a low transmittance at those angles and a retardation of 800 nm to 1000 nm. To hide the image on the main LCD from the line of sight at angles of elevation in excess of 40°, a SW LCD can be used which exhibits a low transmittance at those angles and a retardation of 500 nm to 600 nm.

FIG. 13 is a graph representing measurements on SW LCDs of example 3 in the multiple image display mode. The SW LCDs were preferably oriented so that the major axis direction of the liquid crystal molecules is substantially parallel to the polarized-light-transmission axis as in example 1, because the transmittance was higher at large angles of elevation than in FIG. 12. The characteristics of the curves are similar to those in FIG. 12. An optimal retardation may be chosen in the same manner as in FIG. 12.

The description has so far assumed that the SW LCD 12 is before the main LCD 14, that is, located closer to the display plane than the main LCD 14. As with a display section 44 shown in FIG. 14, however, the SW LCD 12 may be behind the main LCD 14 (opposite to the display plane side) because the SW LCD 12 can likewise control incident light to the main LCD 14, hence viewing angles. In the display section 44, the second and third polarizers 11, 15 are located on the respective sides of the main LCD 14, and the first polarizer 13 is an outside surface of the SW LCD 12.

However, if the SW LCD 12 is located before the main LCD 14, the profile of the image superposed by the main LCD 14 appears more clearly. The SW LCD 12 may be either before or behind the main LCD 14 if the main LCD 14 effects a transmissive liquid crystal display in the multiple image display mode. If it effects a reflective liquid crystal display, however incident light does not pass through the main LCD 14, but is reflected by the main LCD 14. The SW LCD 12 therefore needs to be positioned before the main LCD 14.

In contrast, when the SW LCD 12 is behind the main LCD 14, the SW LCD 12 does not cause light to decay if the main LCD 14 effects a reflective liquid crystal display. Therefore, it is preferable to dispose the SW LCD 12 behind the main LCD 14 when the main LCD 14 is of a transflective type or effects a reflective liquid crystal display in the single image display mode.

In addition, the display device of the present invention switches to the single image display mode in the absence of voltage applied to the transparent electrode films and switches to the multiple image display mode when a predetermined voltage is applied to the transparent electrode films. The device may be configured so that it operates in the multiple image display mode in the absence of applied voltage and switches to the single image display mode when a predetermined voltage is applied to the transparent electrode film. This operation is achieved by giving the liquid crystal molecules a pretilt of, for example, 45° from the substrates and controlling alignment so that the liquid crystal molecules align substantially vertical or parallel to the substrates under applied voltage. This configuration allows reduction in power consumption if the device is often used in the multiple image display mode at narrow viewing angles.

In addition, the SW LCD 12 contains a the patterned electrodes from which a logo is carved out and in the multiple image display mode, changes the alignment of the liquid crystal molecules associated with the position of the patterned electrodes. The SW LCD 12 may however be driven by a matrix scheme. For example, the alignment of the liquid crystal molecules associated with the pixels on the SW LCD 12 may be controlled by the switching of TFTs (thin film transistors) in the pixels. When this is the case, the alignment of the liquid crystal molecules can be changed in areas in accordance with a video signal fed to the SW LCD 12; any still image or moving image can be superimposed onto the image on the main LCD 14.

Further, the display device of the present embodiment controls the viewing angle so that the image on the main LCD 14 is not visible from oblique directions (either leftward or rightward off the front). This is not the only possibility. The viewing angle may be controlled so that the image is not visible from obliquely upward or downward directions.

To achieve this operation, image display means may be pasted to image switching means so that the left/right direction of the image displayed on the image display means is substantially parallel to a plane defined by points on the liquid crystal molecules when their alignment is changed.

Figure 15:
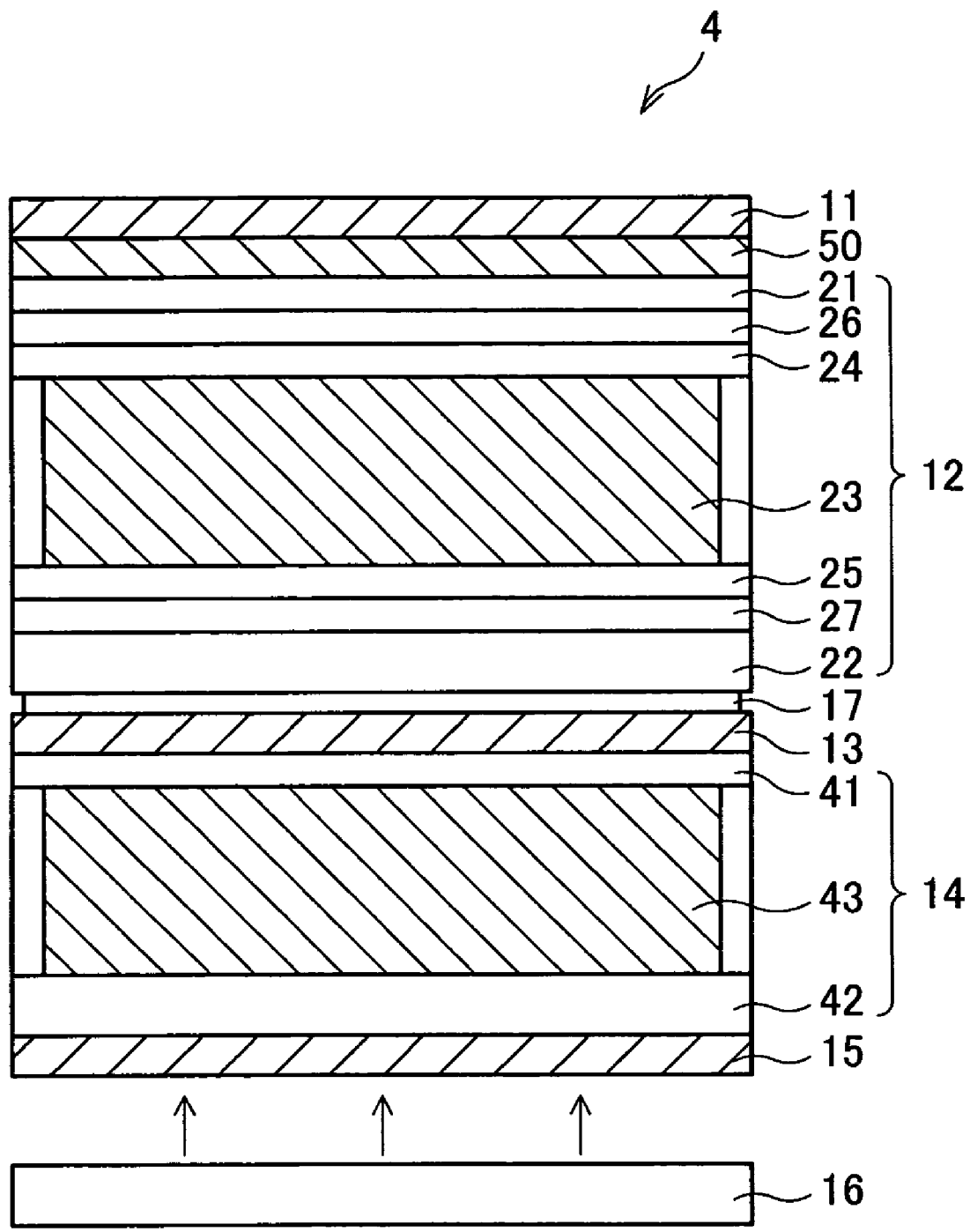
FIG. 15 is a cross-sectional view of a display section of a mobile phone in accordance with a further embodiment of the present invention.

In addition, the display device of the present embodiment uses the first polarizer 13 and the second polarizer 11 of which the same polarized-light-transmission axes are in the same direction. However, when the polarized-light-transmission axes have an axis angle to each other, the device is capable of the same functions if there is provided a polarized light rotating member 50, between the second polarizer 11 and the substrate 21, which rotates the polarization direction of incident light as shown in FIG. 15. Specifically, the polarized light rotating member 50 rotates the polarization direction of the linearly polarized light leaving liquid crystal molecules so that the second polarizer 11 lets the light pass through. This action enables the second polarizer 11 to let the linearly polarized light leaving the liquid crystal molecules pass through even if the polarized-light-transmission axis of the first polarizer 13 does not match with that of the second polarizer 11. The polarized light rotating member 50 may be a half-wave plate (phase differential plate).

The polarized light rotating member 50 may be disposed anywhere between the first polarizer 13 and the second polarizer 11, on a light-entering side or a light-leaving side of the liquid crystal layer. Also, the polarized light rotating member 50 may be disposed on a light-entering side of the first polarizer 13.

The present embodiment has so far described the present invention being applied to liquid crystal display sections in mobile phones. This is not the only possibility. The invention is also applicable to mobile personal computers, AV equipment, DVD players, and other mobile electronics with a display device. The invention may also be applied to a non-mobile display device to realize a display device which shows different displays depending on viewing direction.

The display device of the present embodiment is preferably such that: a direction of a polarized-light-transmission axis of the first polarizer is parallel to that of the second polarizer; and the direction of the polarized-light-transmission axis is substantially parallel or substantially vertical to the major axis direction of the liquid crystal molecules when projected from the normal to the substrates of the display switching section.

Hence, the direction of the polarized-light-transmission axis of the first polarizer is the same as that of the second polarizer. The second polarizer can filter out linearly polarized light leaving the liquid crystal molecules without using another member. Therefore, the configuration gives a simple structure where the second polarizer filters out the linearly polarized light leaving the liquid crystal molecules.

The display device of the present embodiment preferably further includes a polarized light rotating member, for rotating a polarization direction of light, provided between the first polarizer and the second polarizer, wherein the polarized light rotating member rotates a polarization direction of the linearly polarized light incident to the liquid crystal molecules or a polarization direction of the linearly polarized light leaving the liquid crystal molecules so as to produce linearly polarized light which is filtered out by the second polarizer.

Hence, the polarized light rotating member rotates the polarization direction of the linearly polarized light leaving the liquid crystal molecules to produce linearly polarized light which is filtered out by the second polarizer. If the polarized-light-transmission axis of the first polarizer does not match with that of the second polarizer, the second polarizer can still filter out the linearly polarized light leaving the liquid crystal molecules. Therefore, it becomes possible to utilize the polarizer for the liquid crystal display device as either the first polarizer or the second polarizer.

The display device of the present embodiment is preferably such that an alignment direction of the liquid crystal molecules is changed in a region of a particular shape by switching between the single image display mode and the multiple image display mode.

Hence, when switching between the single image display mode and the multiple image display mode, the alignment direction of the liquid crystal molecules is changed only in the region of a particular shape. Where the alignment direction is not changed, the image on the image display section is visible in either mode if viewed from oblique directions. Therefore, a logo, cartoon character, or other particular shape can be displayed when viewed from an oblique direction in the multiple image display mode.

In addition, the displayed logo or cartoon character does not appear with black and white being reversed depending on viewing direction. The same image is displayed for any angle. The image on the liquid crystal display section can be hidden by displaying an almost entirely black image.

The display device of the present embodiment is preferably such that: a patterned electrode of a particular shape is formed on at least one of the pair of substrates; the alignment direction of the liquid crystal molecules is changed in a region in which voltage is applied to the patterned electrode.

Hence, when switching between the single image display mode and the multiple image display mode, the alignment direction of only those liquid crystal molecules under the voltage applied to the patterned electrode is changed. Therefore, the region where the alignment direction is changed corresponds to the particular shape of the patterned electrode. Where the alignment direction is not changed, the image on the image display section is visible in either mode if viewed from oblique directions. Therefore, a particular shape corresponding to the patterned electrode is visible when viewed from an oblique direction in the multiple image display mode.

For example, when switching to the multiple image display mode in response to voltage application to the patterned electrode, a cartoon character or logo is visible on a black background when viewed from an oblique direction in the multiple image display mode by forming an electrode from which a cartoon character or logo is carved out as the patterned electrode.

The display device of the present embodiment is preferably such that the display device switches to the single image display mode in the absence of voltage applied to the liquid crystal molecules and switches to the multiple image display mode with predetermined voltage being applied to the liquid crystal molecules.

It is easier to align the liquid crystal molecules parallel or vertical to the substrates in the absence of applied voltage than to tilt the molecules at a predetermined angle. Therefore, it is preferable to design the display device to operate in the single image display mode in the absence of applied voltage. If the device is often used in the single image display mode, its power consumption is lowered by designing it to operate in the single image display mode in the absence of applied voltage.

The display device of the present embodiment preferably further includes an image display section for displaying the image, wherein: the image displayed by the image display section is visible from any direction in the single image display mode; and in the multiple image display mode, another image is visible from a particular direction, superposed on the image displayed by the image display section, due to birefringence of the display switching section.

Hence, with the display device realized, the image displayed by the image display section is visible from any direction in the single image display mode. In the multiple image display mode, another image is superposed on a display image for a particular direction to hide the display image.

The "particular direction" refers to any direction other than the front direction defined above.

In addition, in this configuration, realization is possible by controlling the alignment so that in the multiple image display mode, the major axis direction of at least some of the liquid crystal molecules in the image switching section when projected from the normal to the substrates is substantially parallel or substantially vertical to the polarization direction of light after transmission through the first polarizer, and the major axis direction of the liquid crystal molecules are tilted from the substrates.

The display device of the present embodiment preferably further includes an image display section for displaying the image, wherein the liquid crystal molecules are tilted from top/bottom directions on the image displayed by the image display section in the multiple image display mode.

Here, the liquid crystal molecules being "tilted along the top/bottom directions on the image displayed by the image display section refers to tilting upward or downward on the image displayed by the image display section from a state vertical to the substrates. That is, the image display section is pasted to the display switching section so that the plane defined by points on the liquid crystal molecules when their alignment is changed is substantially parallel to the top/bottom directions on the image displayed by the image display section.

In this configuration, when placed so that the top/bottom directions on the image on the image display section along a vertical direction, the image on the image display section is visible from the front of the display device, and an image with another image superposed by the image switching section is visible from the left and right of the device. Therefore, the image can be hidden from more people where the heights of lines of sight are supposedly relatively constant, for example, where there are many people standing.

The display device of the present embodiment preferably further includes an image display section for displaying the image on a side of the first polarizing means with respect to the display switching section, wherein: the second polarizer is pasted to the display switching section; the first polarizer is pasted onto a surface of the image display section which faces the display switching section, and a third polarizer is pasted onto a surface opposite the display switching section; and the display device is fabricated by pasting the image display section via the first polarizing means, to a surface of the display switching section onto which the second polarizer is not pasted.

Hence, the polarizer, the image display section, the polarizer, the display switching section, and the polarizer are layered in this order; the image quality of the display device therefore improves.

In addition, the polarizer is provided only on one side of the display switching section. Thus, there is only one polarizer between the image display section and the display switching section. This is advantageous in terms of cost and manufacture steps. Further, with the polarizer being provided only on one side of the display switching section, the display device can be used when polarizers are already provided on both sides of the image display section, for example, when the image display section is a liquid crystal display device.

The display device of the present embodiment preferably further includes an image display section for displaying the image, wherein: either the image display section or the display switching section includes a polarized light rotating member for rotating a polarization direction; the polarized light rotating member rotates a polarization direction of linearly polarized light incident to the first polarizer, or a polarization direction of the linearly polarized light incident to the liquid crystal molecules, or a polarization direction of the linearly polarized light leaving the liquid crystal molecules so as to produce linearly polarized light which is filtered out by the second polarizer.

Hence, the polarized light rotating member provided to the image display section or the display switching section rotates the polarization direction of the linearly polarized light leaving the liquid crystal molecules to produce linearly polarized light which will be filtered out by the second polarizer. Therefore, if the polarized-light-transmission axis of the first polarizer does not match with that of the second polarizer, the second polarizer can still filter out the linearly polarized light leaving the liquid crystal molecules. Therefore, it becomes possible to utilize the polarizer provided to the liquid crystal display section as either the first polarizer or the second polarizer.

The display device of the present embodiment preferably further includes an image display section for displaying the image, wherein the image display section switches luminance between the single image display mode and the multiple image display mode.

Hence, by specifying high luminance in the single image display mode and low luminance in the multiple image display mode, the image on the image display section is more effectively hidden. The power consumption by the image display section can be lowered.

The display device of the present embodiment is preferably such that in the multiple image display mode, the major axis direction of the liquid crystal molecules makes an angle of not less than 40° and not more than 50° to the substrates.

By setting the angle between the major axis direction of the liquid crystal molecules and the substrates in the image switching section to 45°, the major axis direction of the liquid crystal molecules when projected from an oblique direction makes a cross angle of 45° to the polarization direction of incident light. Viewed from an oblique direction under these circumstances, optimal birefringence occurs with the liquid crystal molecules. The polarization direction of light after transmission through the liquid crystal layer is changed. The second polarizer blocks that light, optimally hiding the image on the image display section.

Therefore, by setting the angle between the major axis direction of the liquid crystal molecules and the substrates in the multiple image display mode to not less than 40° and not more than 50°, another image is superposed on a display image when viewed in a particular direction to hide the display image well. The functions of altering the viewing angle to suit the current situation is improved. In contrast, when the angle between the major axis direction of the liquid crystal molecules and the substrates is out of the range, birefringence effect is poorer; the image may not well hidden.

The multiple image display device of the present embodiment is preferably such that in the multiple image display mode, an image of the image display section is displayed for the front direction and an image of the optical element is displayed for the side directions.

The multiple image display device of the present embodiment is preferably such that in the multiple image display mode, the device displays an identical image for left and right side directions or obliquely upward or downward directions.

The multiple image display device of the present embodiment is preferably such that: the optical element for electrically switching between the single and multiple image display modes includes a pair of substrates and a liquid crystal layer filling a gap between the pair of substrates; a transparent electrode film is formed on each side of the substrates which faces the liquid crystal layer; and a pattern is formed in the transparent electrode films to display letters, symbols, or cartoon characters for left and right side directions or obliquely upward or downward directions.

The multiple image display device of the present embodiment is preferably such that an alignment direction of liquid crystal in the liquid crystal layer in the optical element is a uniaxial alignment parallel or vertical to a surface of the substrates in the optical element in the single image display mode and a uniaxial oblique alignment tilted obliquely from the substrates in the multiple image display mode; the device electrically switches between the two alignments in the single image display mode and the multiple image display mode.

The multiple image display device of the present embodiment is preferably such that the alignment direction is a top/bottom direction or a left/right direction when viewed from a vertical direction to a display plane.

The multiple image display device of the present invention is preferably such that the optical element for electrically switching between the single and multiple image display modes includes a pair of substrates and a liquid crystal layer filling a gap between the pair of substrates and controls alignment of liquid crystal molecules corresponding to pixels on the optical element by switching of TFTs in the pixels.

The multiple image display device of the present embodiment is preferably such that there is provided a polarizer on only one of the pair of substrates, in the optical element provided on the front face or the back face of the image display section, which is farther from the image display section.

The multiple image display device of the present embodiment is preferably such that the image display section allows any luminance setting in the single image display mode and in the multiple image display mode.

The multiple image display device of the present embodiment is preferably such that the optical element for electrically switching between the single and multiple image display modes is driven by a matrix scheme.

The multiple image display device of the present embodiment is preferably such that in the multiple image display mode, an image of the image display section is displayed for the front direction, an image of the optical element is displayed for the side directions, and the image of the optical element displayed for the side directions includes a moving image.

The display device of the present invention can be set up to operate in mode where different images are visible for different line-of-sight directions. The device is therefore applicable to mobile communications terminals, mobile personal computers, AV equipment, DVD players, and other mobile electronics with a display device. The device is also applicable to display devices which display multiple set of information for different line-of-sight directions.

The present invention is not limited to the description of the embodiments above, but may be altered by a skilled person within the scope of the claims. An embodiment based on a proper combination of technical means disclosed in different embodiments is encompassed in the technical scope of the present invention.

What is claimed is:

1. A display device, comprising:
    display switching means for electrically switching a visible image between a single image display mode and a multiple image display mode;
    first polarizing means for causing linearly polarized light in a predetermined direction to enter the display switching means; and
    second polarizing means for filtering out linearly polarized light in a predetermined direction from light leaving the display switching means,
    wherein:
    the display switching means is a liquid crystal layer disposed between a pair of substrates,
    a polarized-light-transmission axis of the first polarizing means is parallel to a polarized-light-transmission axis of the second polarizing means, and a direction of the polarized-light-transmission axis is substantially parallel or substantially vertical to a major axis direction of liquid crystal molecules in the liquid crystal layer when the liquid crystal molecules are projected from the normal to the substrates,
    in the single image display mode, the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules are aligned so that the major axis direction of the liquid crystal molecules in the liquid crystal layer is substantially parallel or substantially vertical to the substrates, and
    in the multiple image display mode, the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules in the liquid crystal layer are aligned so that the major axis direction of the liquid crystal molecules are tilted from the substrates.

2. The display device of claim 1, wherein an alignment direction of the liquid crystal molecules is changed in a region of a particular shape by switching between the single image display mode and the multiple image display mode.

3. The display device of claim 2, wherein:
a patterned electrode of a particular shape is formed on at least one of the pair of substrates;
the alignment direction of the liquid crystal molecules is changed in a region in which voltage is applied to the patterned electrode.

4. The display device of claim 1, wherein the display device switches to the single image display mode in the absence of voltage applied to the liquid crystal molecules and to the multiple image display mode with a predetermined voltage being applied to the liquid crystal molecules.

5. The display device of claim 1, further comprising image display means for displaying the image,
wherein:
the image displayed by the image display means is visible from any direction in the single image display mode; and
in the multiple image display mode, another image is visible from a particular direction, superposed on the image displayed by the image display means, due to birefringence of the display switching means.

6. The display device of claim 1, further comprising image display means for displaying the image, wherein the liquid crystal molecules are tilted from top/bottom directions on the image displayed by the image display means in the multiple image display mode.

7. The display device of claim 1, further comprising image display means for displaying the image provided on a side of the first polarizing means with respect to the display switching means,
wherein:
the second polarizing means is pasted to the display switching means;
the first polarizing means is pasted onto a surface of the image display means which faces the display switching means, and a third polarizing means is pasted onto a surface opposite the display switching means; and
the display device is fabricated by pasting the image display means via the first polarizing means, to a surface of the display switching means onto which the second polarizing means is not pasted.

8. The display device of claim 1, further comprising image display means for displaying the image,
wherein the image display means switches luminance between the single image display mode and the multiple image display mode.

9. The display device of claim 1, wherein in the multiple image display mode, the major axis direction of the liquid crystal molecules makes an angle of not less than 40° and not more than 50° to the substrates.

10. A viewing angle control device for controlling a viewing angle for incident light for output, the device comprising:
a liquid crystal element including a liquid crystal layer disposed between a pair of substrates; and
a linear polarizer, disposed on the liquid crystal element, for filtering out linearly polarized light in a predetermined direction from light leaving the liquid crystal element,
the device electrically switching between:
a state where a polarized-light-transmission axis of the linear polarizer is parallel to linearly polarized light incident to the liquid crystal element, a direction of the polarized-light-transmission axis is substantially parallel or substantially vertical to a major axis direction of liquid crystal molecules in the liquid crystal layer when the liquid crystal molecules are projected from the normal to the substrates, a major axis direction of liquid crystal molecules in the liquid crystal layer is in a plane defined by a direction of a transmission axis or an absorption axis of the linear polarizer and a traveling direction of light, and the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules in the liquid crystal layer are aligned so that the major axis direction of the liquid crystal molecules is substantially parallel or substantially vertical to the substrates and said at least some of the liquid crystal molecules are substantially vertical or substantially parallel to a traveling direction of light; and
a state where a polarized-light-transmission axis of the linear polarizer is parallel to linearly polarized light incident to the liquid crystal element, a direction of the polarized-light-transmission axis is substantially parallel or substantially vertical to the major axis direction of the liquid crystal molecules when the liquid crystal molecules are projected from the normal to the substrate, the major axis direction of the liquid crystal molecules in the liquid crystal layer is in a plane defined by a direction of a transmission axis or an absorption axis of the linear polarizer and a traveling direction of light, and the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules in the liquid crystal layer are aligned so that the major axis direction of the liquid crystal molecules are tilted from the substrates and said at least some of the liquid crystal molecules are tilted from a traveling direction of light.

11. An electronic device comprising the display device of claim 1.

12. An electronic device comprising the viewing angle control device of claim 10.

13. A multiple image display device, comprising
an optical element on either a front face or a back face of an image display section for displaying an ordinary image, the optical element being capable of electrically switching between a single image display mode where a single image is displayed across a viewing angle which is unique to the image display section and a multiple image display mode where different images are displayed for a front direction of the image display section and for side directions of the image display section;
first polarizing means for causing linearly polarized light in a predetermined direction to enter the optical element; and
second polarizing means for filtering out linearly polarized light in a predetermined direction from light leaving the optical element,
wherein
the optical element is a liquid crystal layer disposed between a pair of substrates,
a polarized-light-transmission axis of the first polarizing means is parallel to a polarized-light-transmission axis of the second polarizing means, and a direction of the polarized-light-transmission axis is substantially parallel or substantially vertical to a major axis direction of liquid crystal molecules in the liquid crystal layer when the liquid crystal molecules are projected from the normal to the substrates, in a single image display mode, the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules in the liquid crystal layer are aligned so that the major axis direction of the liquid crystal molecules is substantially parallel or substantially vertical to the substrates, and in the multiple image display mode, the major axis direction of the liquid crystal molecules in the liquid crystal layer when the liquid crystal molecules are projected from the normal to the substrates is substantially parallel or substantially vertical to a linear polarization direction of light incident to the liquid crystal molecules, and at least some of the liquid crystal molecules in the liquid crystal layer are aligned so that the major axis direction of the liquid crystal molecules are tilted from the substrates.

14. The multiple image display device of claim 13, wherein in the multiple image display mode, an image of the image display section is displayed for the front direction and an image of the optical element is displayed for the side directions.

15. The multiple image display device of claim 13, wherein in the multiple image display mode, the device displays an identical image for left and right side directions or obliquely upward or downward directions.

16. The multiple image display device of claim 13, wherein:
the optical element for electrically switching between the single and multiple image display modes includes a pair of substrates and a liquid crystal layer filling a gap between the pair of substrates;
a transparent electrode film is formed on each side of the substrates which faces the liquid crystal layer; and
a pattern is formed in the transparent electrode films to display letters, symbols, or cartoon characters for left and right side directions or obliquely upward or downward directions.

17. The multiple image display device of claim 16, wherein:
an alignment direction of liquid crystal in the liquid crystal layer in the optical element is a uniaxial alignment parallel or vertical to a surface of the substrates in the optical element in the single image display mode and a uniaxial oblique alignment tilted obliquely from the substrates in the multiple image display mode;
the device electrically switches between the two alignments in the single image display mode and the multiple image display mode.

18. The multiple image display device of claim 17, wherein the alignment direction is a top/bottom direction or a left/right direction when viewed from a vertical direction to a display plane.

19. The multiple image display device of claim 13, wherein: the optical element for electrically switching between the single and multiple image display modes includes a pair of substrates and a liquid crystal layer filling a gap between the pair of substrates and controls alignment of liquid crystal molecules corresponding to pixels on the optical element by switching of TFTs in the pixels.

20. The multiple image display device of claim 13, wherein there is provided a polarizer on only one of the pair of substrates, in the optical element provided on the front face or the back face of the image display section, which is farther from the image display section.

21. The multiple image display device of claim 13, wherein the image display section allows any luminance setting in the single image display mode and in the multiple image display mode.

22. The multiple image display device of claim 13, wherein the optical element for electrically switching between the single and multiple image display modes is driven by a matrix scheme.

23. The multiple image display device of claim 13, wherein in the multiple image display mode, an image of the image display section is displayed for the front direction, an image of the optical element is displayed for the side directions, and the image of the optical element displayed for the side directions includes a moving image.

* * * * *